May 14, 1940. C. RASMUSSEN 2,200,894
SAW MACHINE
Filed May 9, 1936 16 Sheets-Sheet 2

Inventor:
Charles Rasmussen
By John E. Gardner

May 14, 1940.  C. RASMUSSEN  2,200,894
SAW MACHINE
Filed May 9, 1936  16 Sheets-Sheet 5

Inventor:
Charles Rasmussen
By John E. Gardner
Atty.

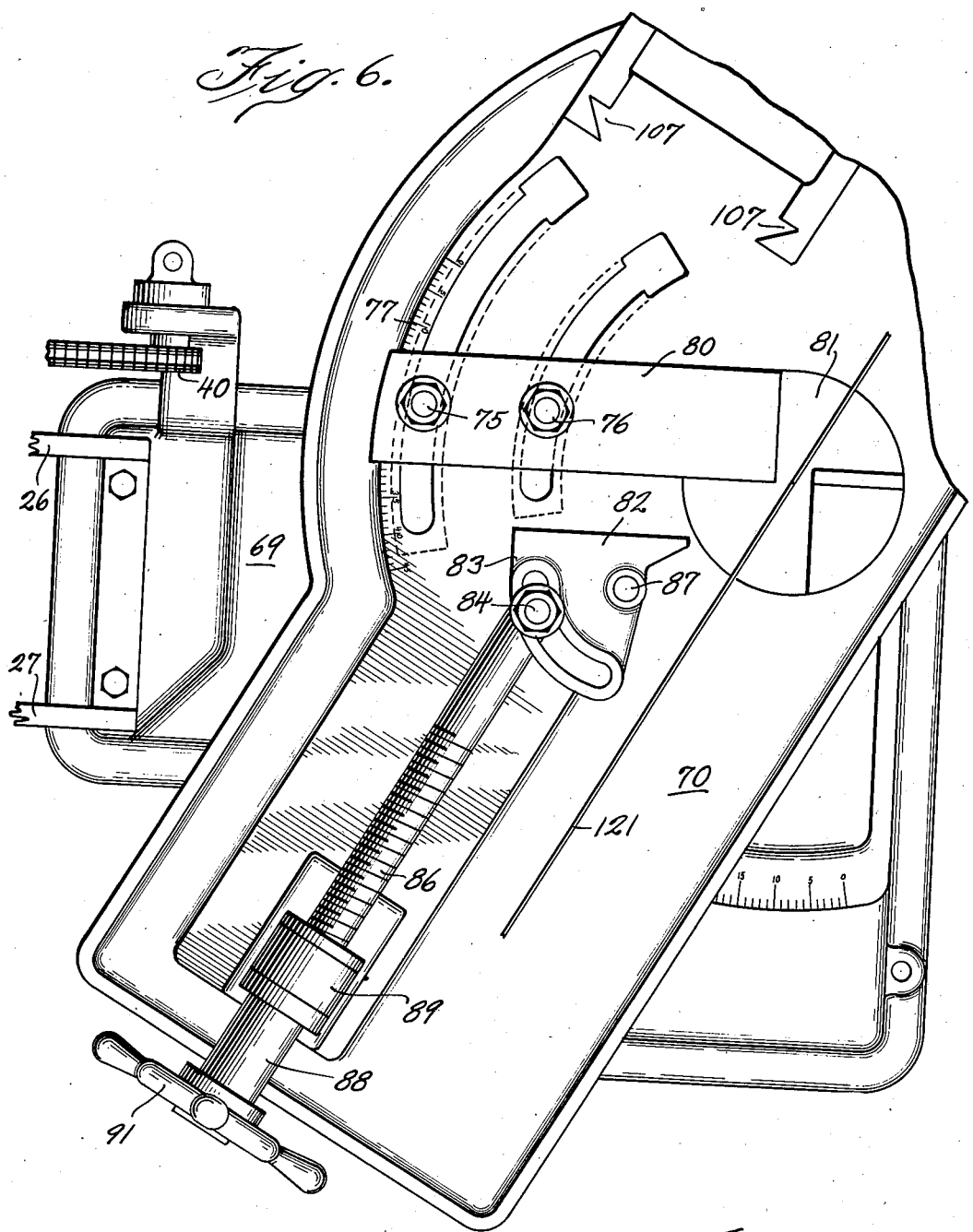

May 14, 1940.　　　　　C. RASMUSSEN　　　　　2,200,894
SAW MACHINE
Filed May 9, 1936　　　16 Sheets-Sheet 7
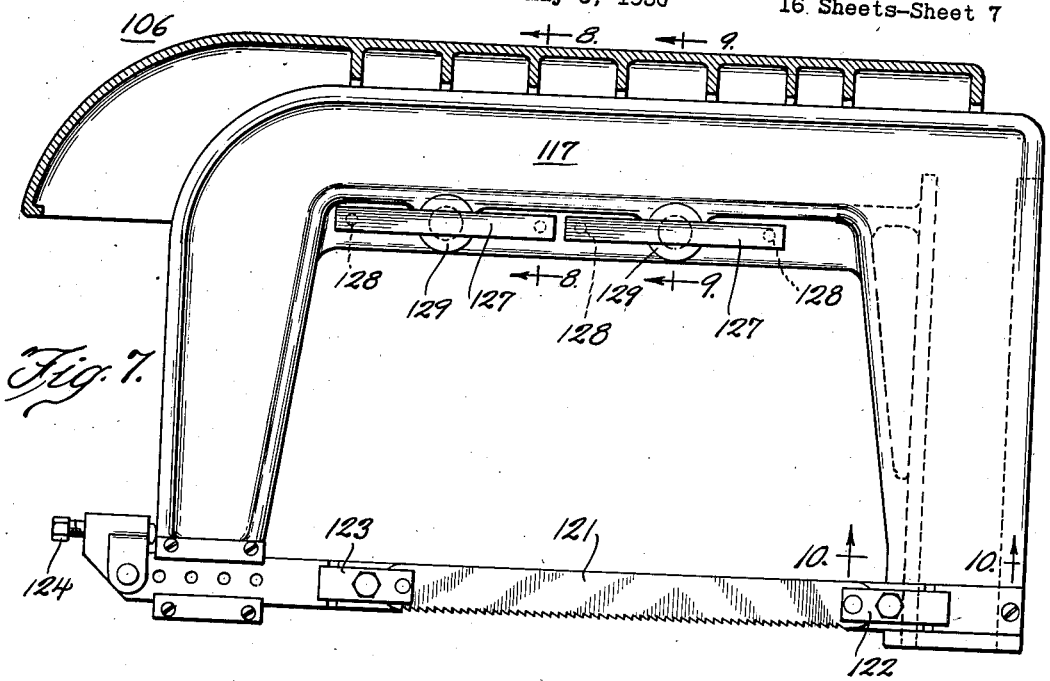
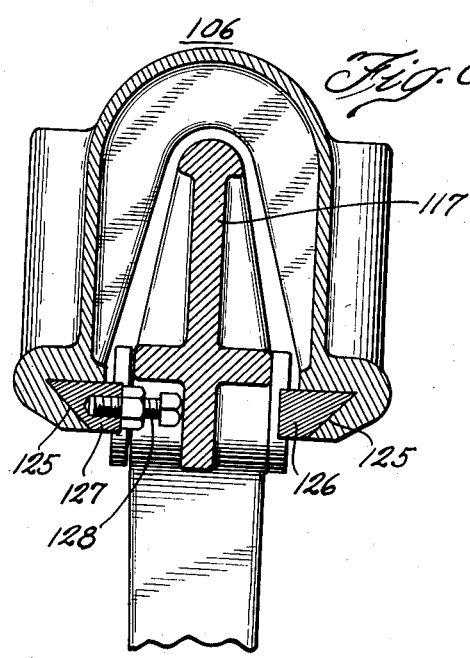
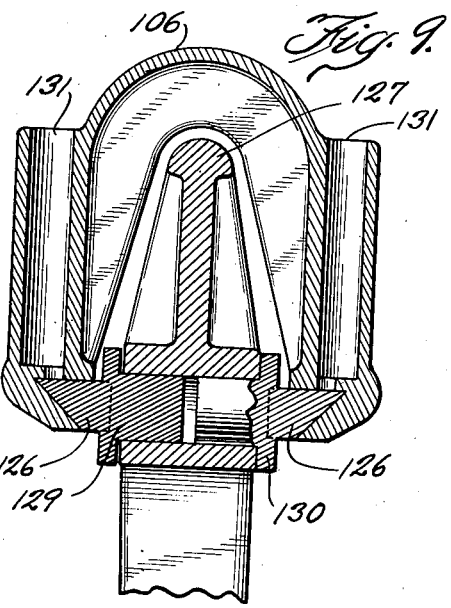
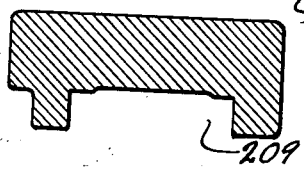
Inventor:
Charles Rasmussen
By John E. Gardner
Atty.

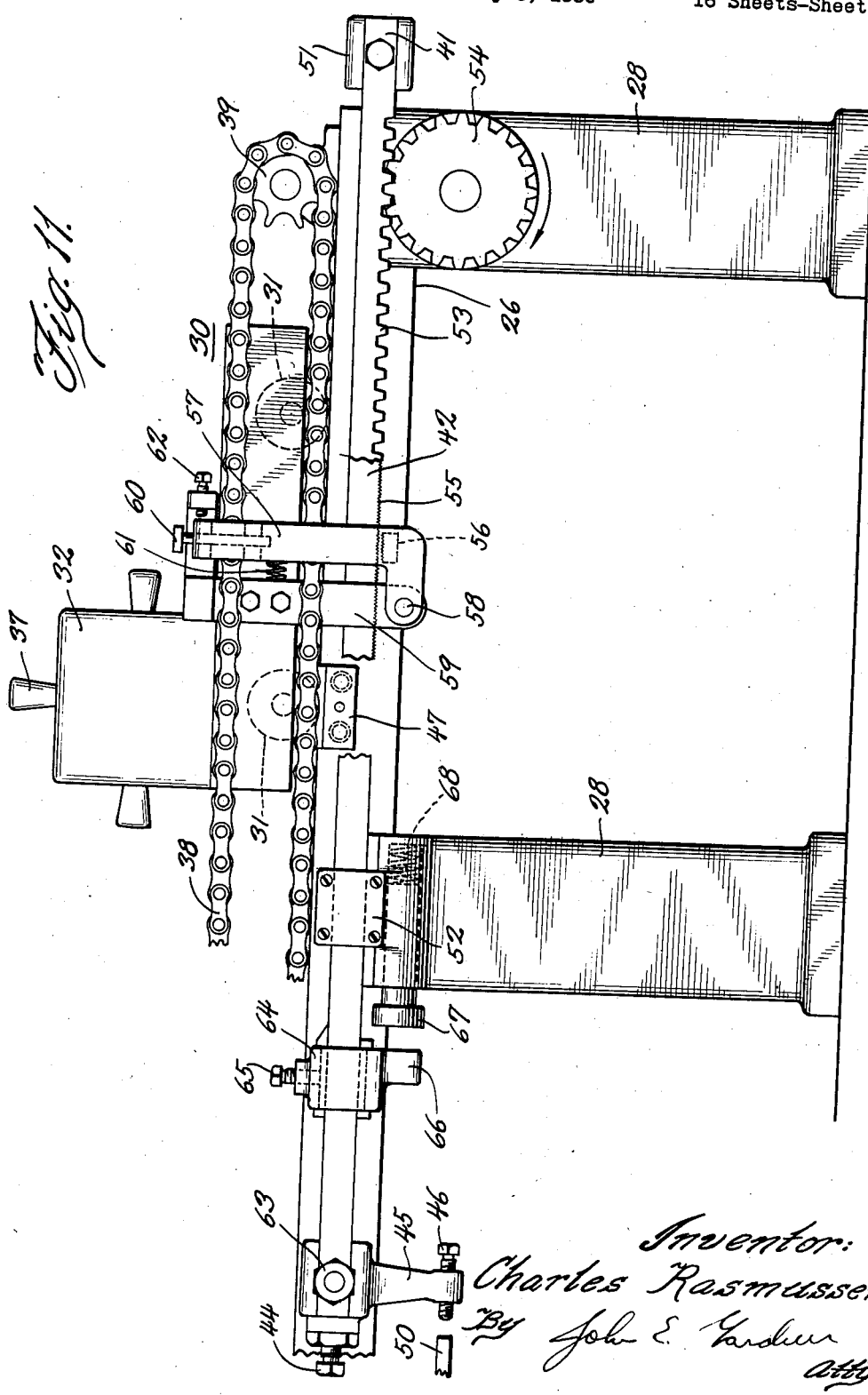

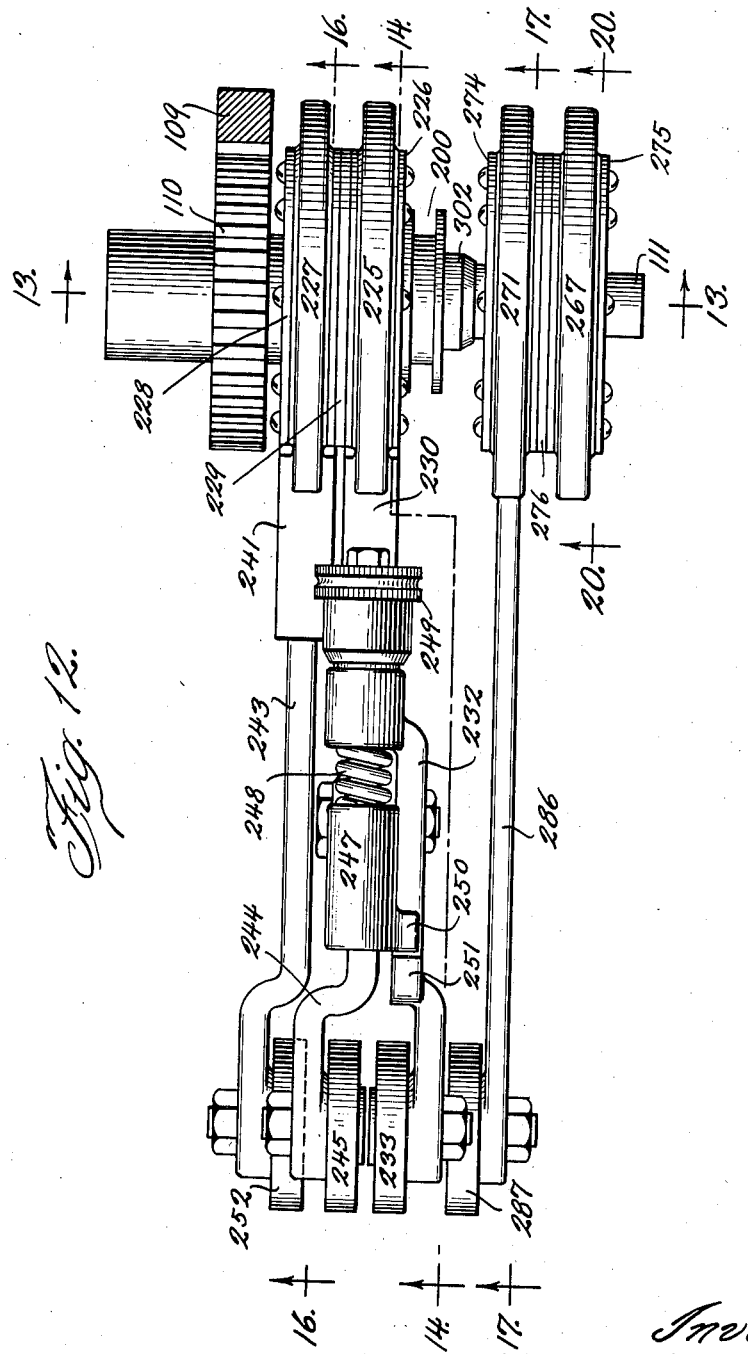

May 14, 1940.   C. RASMUSSEN   2,200,894
SAW MACHINE
Filed May 9, 1936   16 Sheets-Sheet 10
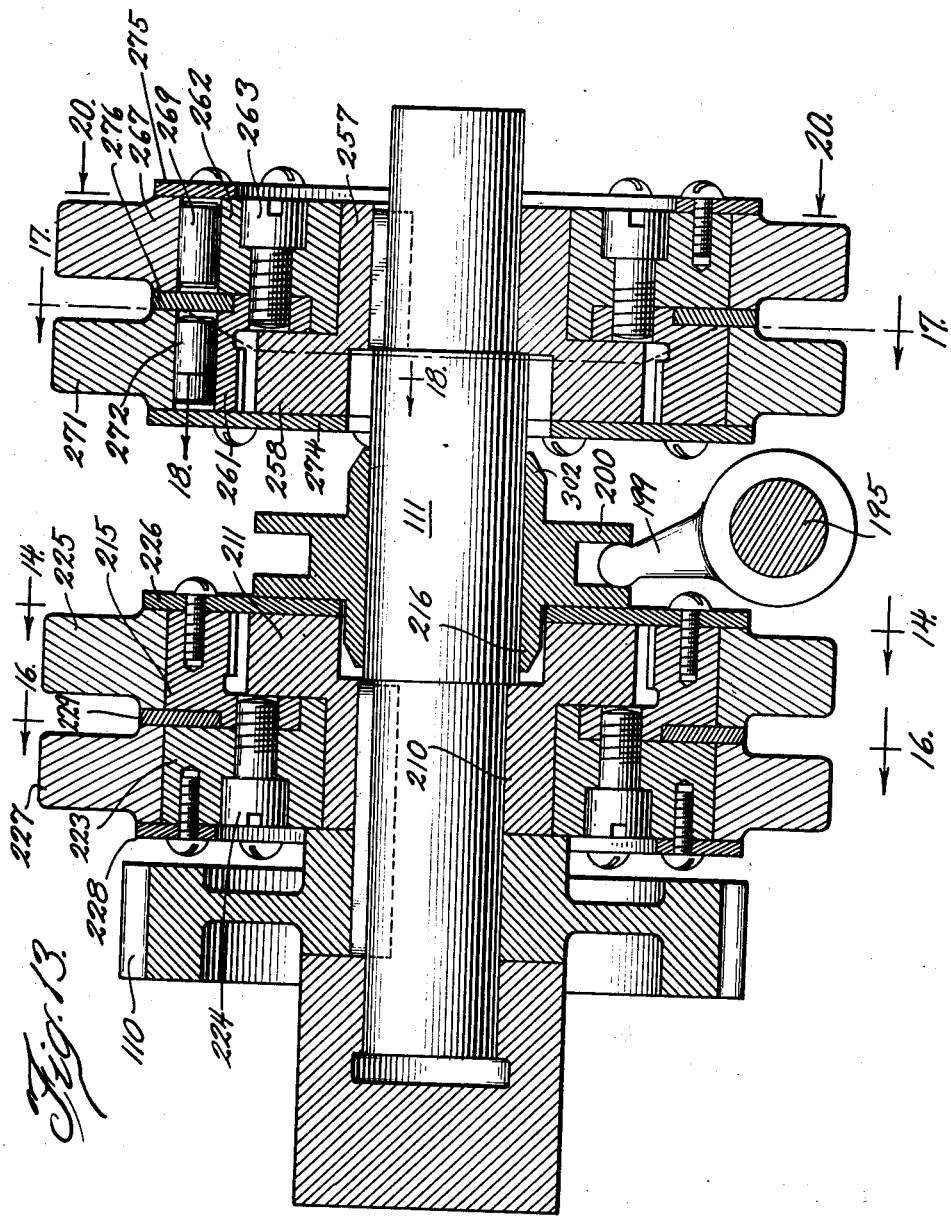
Inventor:
Charles Rasmussen
By John E. Gardner
Atty.

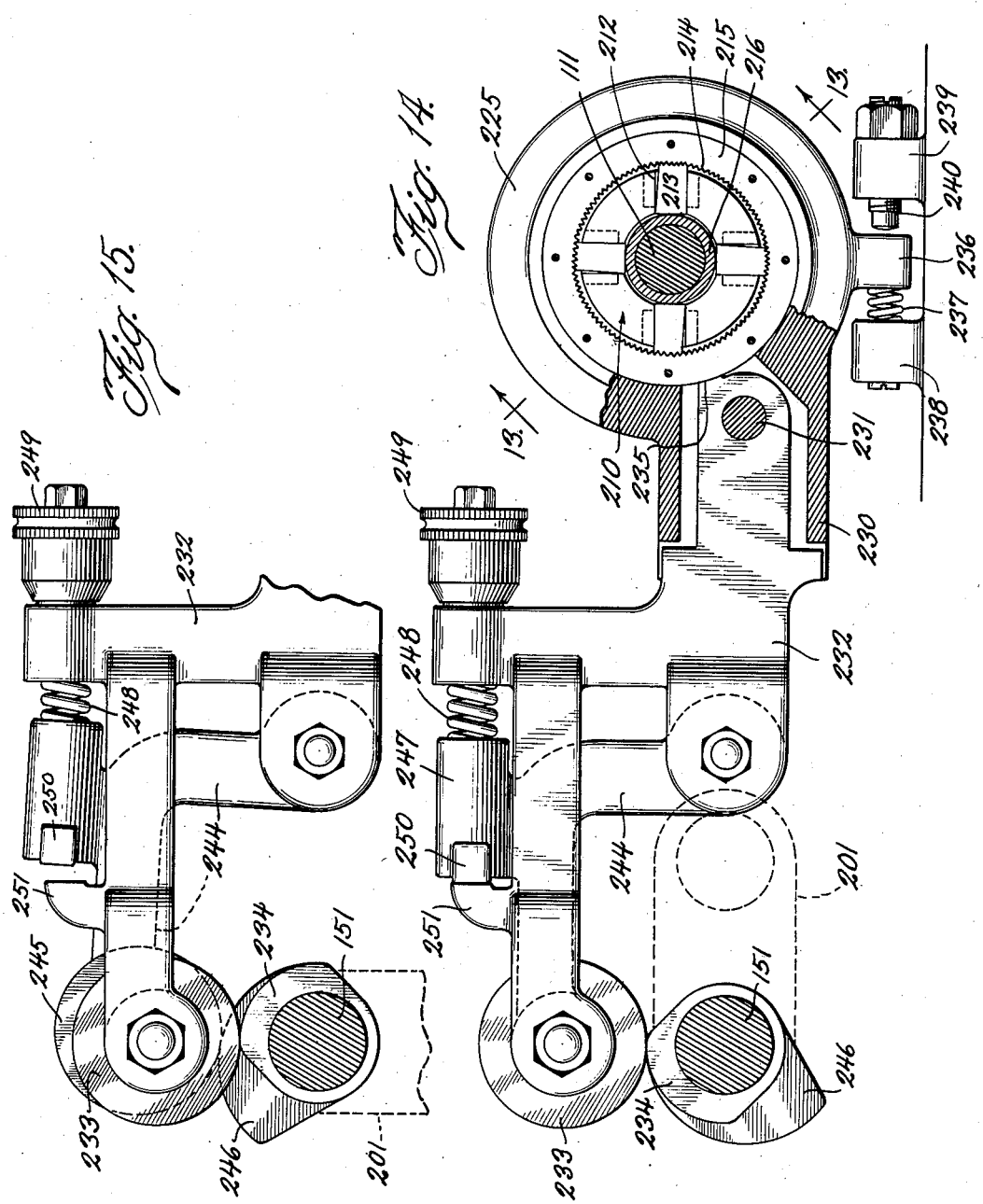

May 14, 1940. C. RASMUSSEN 2,200,894
SAW MACHINE
Filed May 9, 1936 16 Sheets-Sheet 12
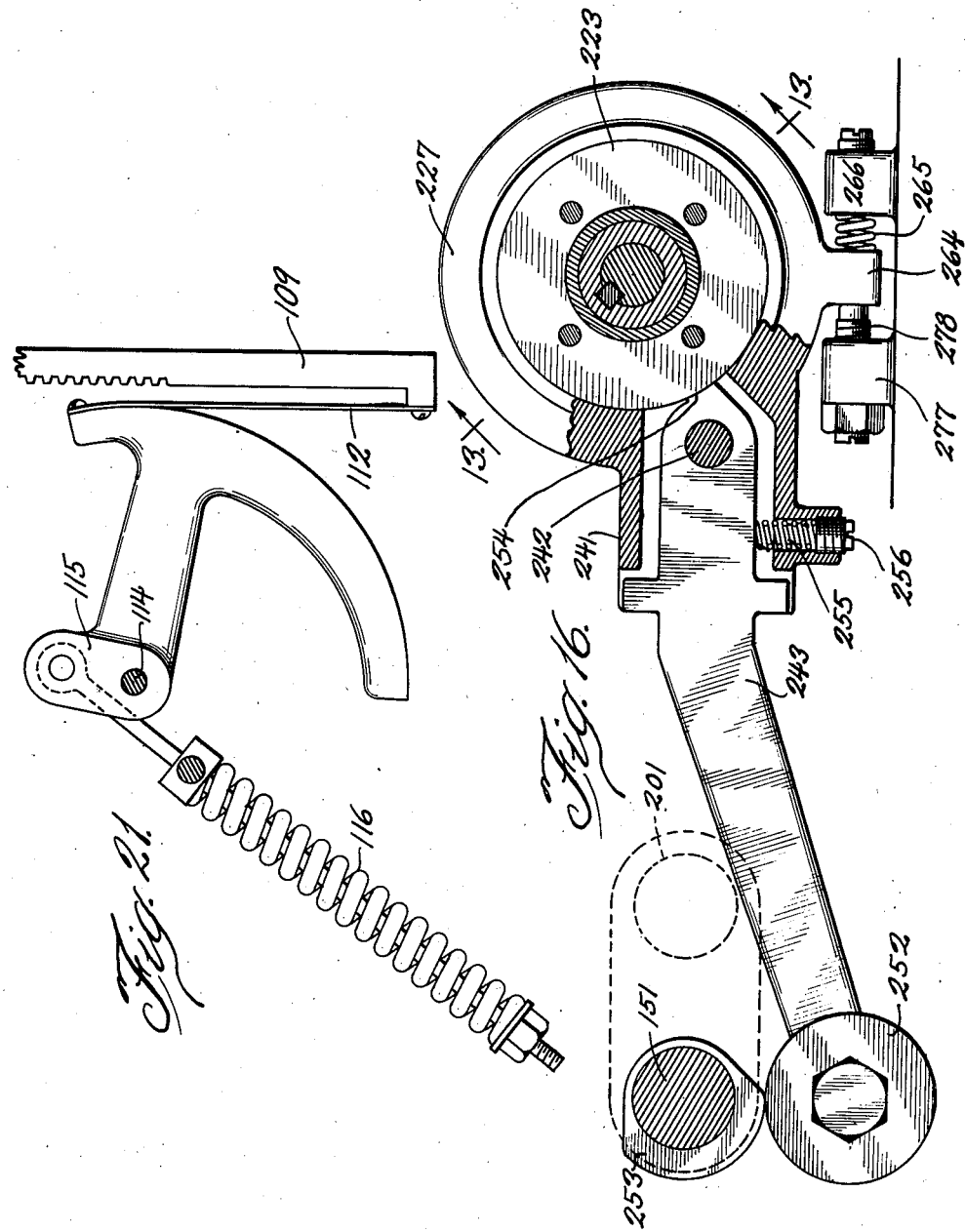
Inventor:
Charles Rasmussen
By John E. Gardner
Atty.

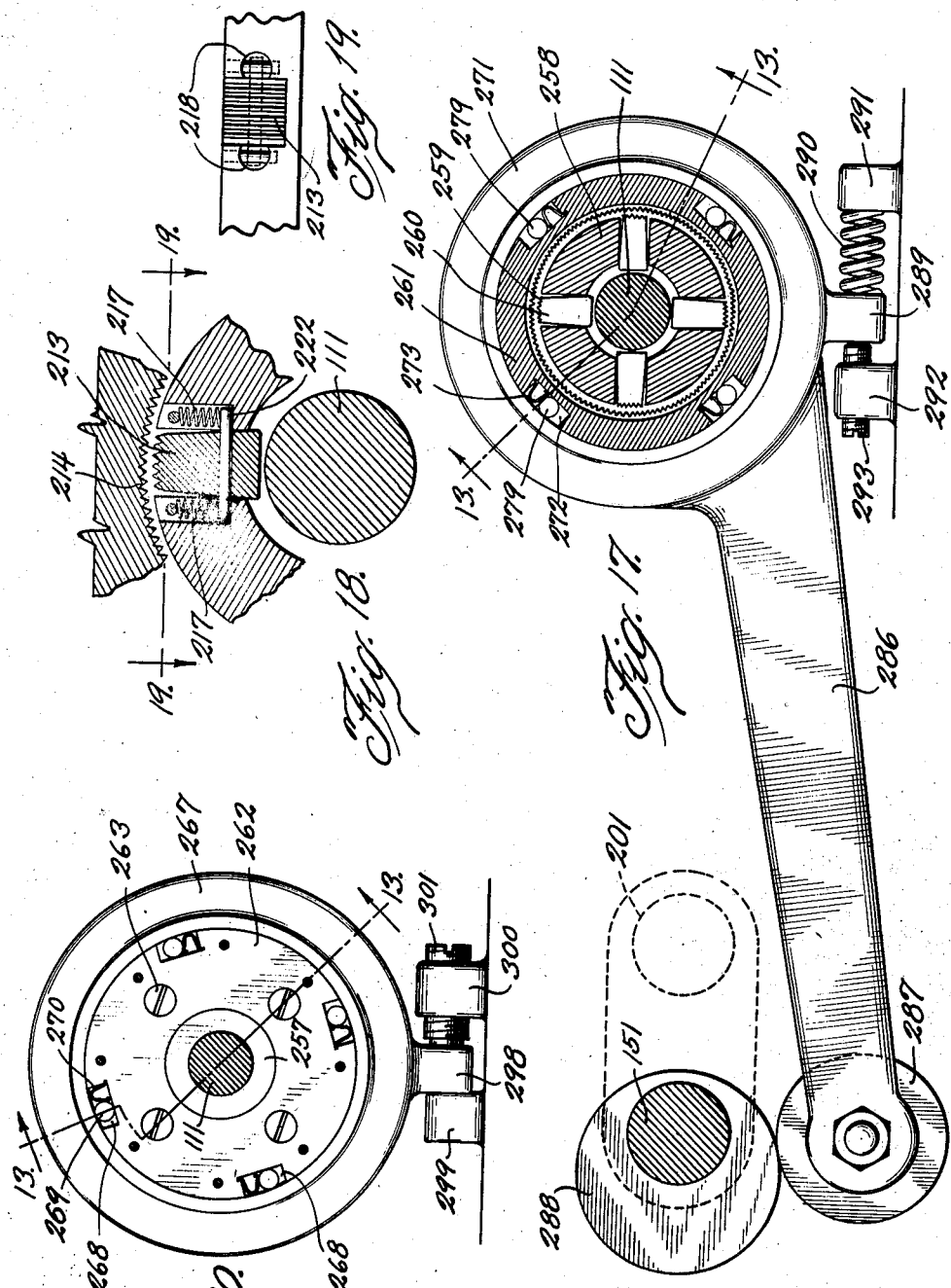

May 14, 1940.   C. RASMUSSEN   2,200,894
SAW MACHINE
Filed May 9, 1936   16 Sheets-Sheet 14
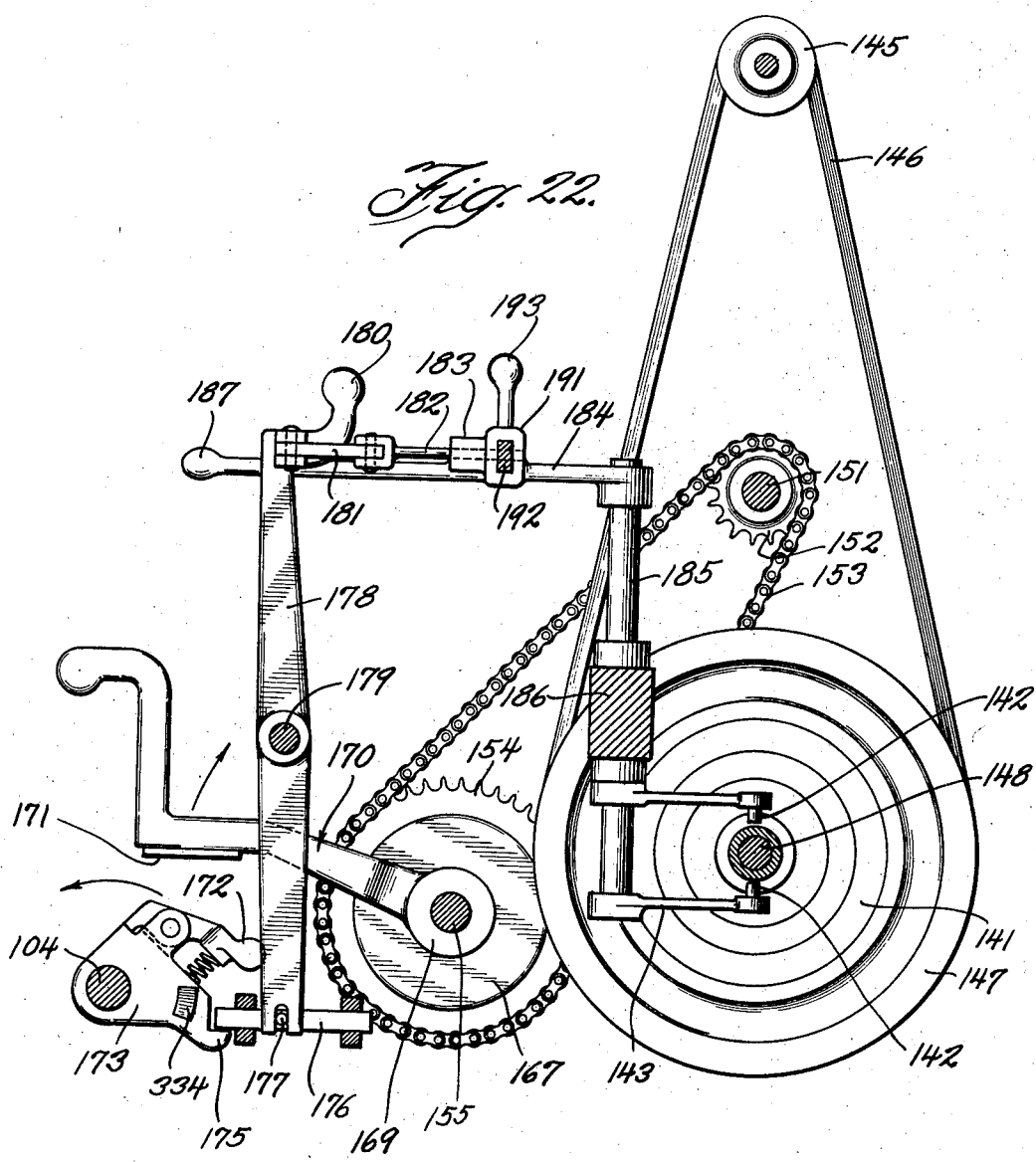

May 14, 1940.  C. RASMUSSEN  2,200,894

SAW MACHINE

Filed May 9, 1936   16 Sheets-Sheet 15

Inventor:
Charles Rasmussen
By John E. Gardner
Atty.

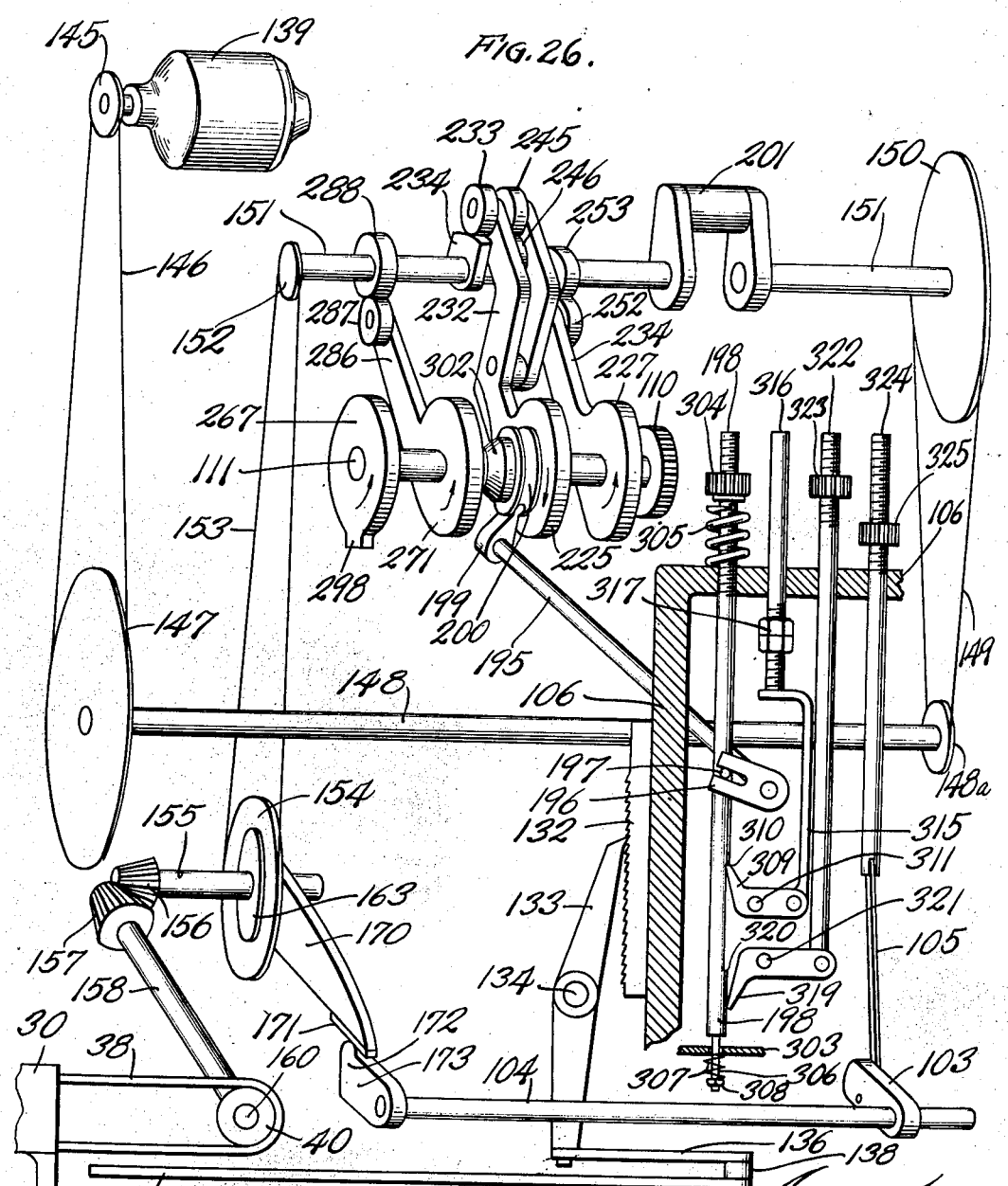

Patented May 14, 1940

2,200,894

UNITED STATES PATENT OFFICE 2,200,894

SAW MACHINE

Charles Rasmussen, Racine, Wis., assignor of one-half to John Oster, Racine, Wis.

Application May 9, 1936, Serial No. 78,841

26 Claims. (Cl. 29—73)

The present invention relates in general to saw machines and more particularly to machines of the hack saw type for sawing metal or other stock in desired lengths.

One of the objects of my invention is to provide an automatic machine of this character.

Another object is to provide a machine by which the metal or stock may be cut at any angle.

Another object is to provide a machine of this character in which the saw itself is movable to secure a different angle of cut.

A further object is to provide an automatic machine of this character that will cut the stock in any desired length very accurately.

A further object is to provide a special type of bearing for the saw so as to prevent torsional strain.

Still another object is to provide means for automatic locking the saw frame in raised position while the stock is being fed.

A still further object is to provide automatic means for feeding the stock below the saw.

There are other objects of my invention, which together with the foregoing will be described in the detailed specifications that are to follow:

My invention consists essentially of feeding mechanism having a vise in which a length of stock is secured, and which is adapted to feed predetermined lengths of the stock beneath the saw. The saw is mounted on a frame which can be placed at any desired angle to the feeding table so that any angle of cut may be secured. Automatic controlling mechanism is provided to coordinate the operation of the feeding mechanism and the saw, and the application of power to each.

The accompanying drawings illustrate a preferred embodiment of my invention.

In the drawings:

Fig. 6 is a fragmentary plan of the saw frame taken along the line 6—6 of Fig. 4 looking in the direction of the arrows;

Fig. 7 is a side elevation of the saw itself and frame holding the same;

Fig. 8 is a cross section of the saw frame taken along the line 8—8 of Fig. 7 looking in the direction of the arrows;

Fig. 9 is a similar view taken along the line 9—9 of Fig. 7 looking in the direction of the arrows;

Fig. 10 is a section taken along the line 10—10 of Fig. 7 looking in the direction of the arrows;

Fig. 11 is a side elevation of the feeding table taken along the line 11—11 of Fig. 2 looking in the direction of the arrows;

Fig. 12 is a fragmentary plan of certain control mechanism taken along the line 12—12 of Fig. 3;

Fig. 13 is a section of the same along the line 13—13 of Fig. 12 looking in the direction of the arrows;

Fig. 14 is a sectional elevation taken along the line 14—14 of Fig. 12 looking in the direction of the arrows;

Fig. 15 is a similar view along the line 14—14;

Fig. 16 is a similar view of certain control mechanism along the line 16—16 of Fig. 12 looking in the direction of the arrows;

Fig. 17 is a sectional elevation of the same along the line 17—17 of Fig. 12;

Fig. 18 is a sectional detail of the clutch mechanism of Fig. 17 taken on the line 18—18 of Fig. 13;

Fig. 19 is a section taken along the line 19—19 of Fig. 18 looking in the direction of the arrows;

Fig. 20 is an elevation particularly in section taken along the line 20—20 of Fig. 13 looking in the direction of the arrows;

Fig. 21 is an enlarged detail of the saw counterbalancing mechanism illustrated in Fig. 4;

Fig. 22 is a sectional elevation of certain portions of the control mechanism of the machine taken along the line 22—22 of Fig. 2 looking in the direction of the arrows; Fig. 26 is a generally schematic diagram illustrating the source of power and the drive of the various parts of the machine.

Like reference characters in the various figures apply to similar parts throughout.

Figure 1:
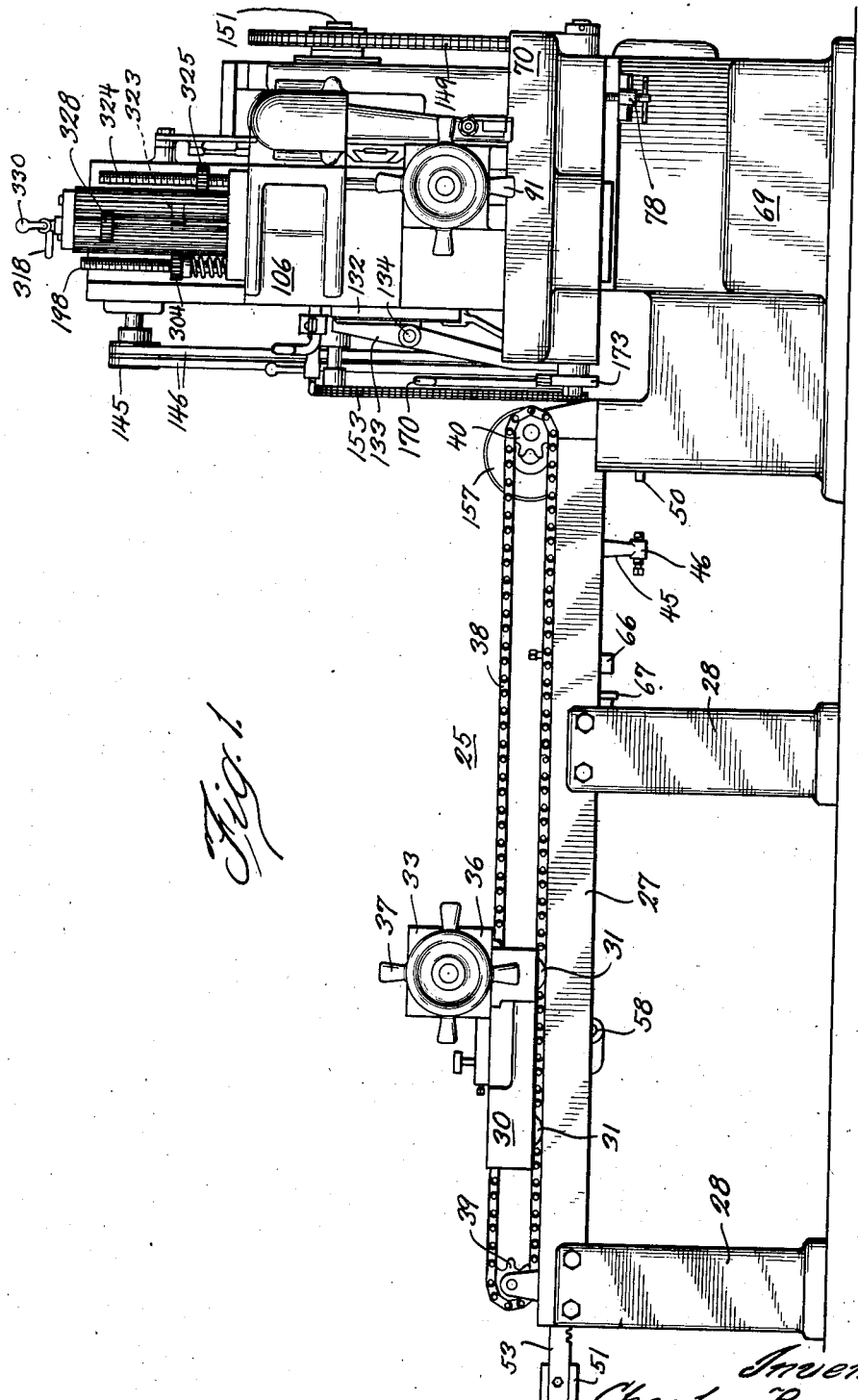
Fig. 1 is a side elevation of my improved automatic saw machine.

The reference character 25 generally designates the feeding table which is formed from structural shapes constituting rails 26 and 27 (Figs. 1 and 2) supported by columns 28. The rails 26 and 27 carry a feeding truck 30 which is formed from structural members and mounted upon wheels 31. The truck 30 carries a vise comprising a fixed jaw or bearing member 32 and a movable jaw 33 operated by a screw 34 penetrating a collar 35 secured to a support 36 mounted upon the truck 30. A hand wheel 37 is employed to turn the collar 35 so as to operate the movable jaw 33 on the vise. The truck 30 is adapted to move on the rails 26 and 27 by a chain 38 which is mounted upon sprockets 39 and 40 at the extremities of the feeding table 25. A pair of long control members 41 and 42 are secured to the truck 30 so as to be moved thereby. The control members 41 and 42 are fastened together at one end by a cross piece 43 and carry a threaded adjusting screw 44 at the same end. The screw 44 in its most forward position strikes an abutment on the base frame 69 preventing further forward movement of the truck 30. An extension 45 is provided with an adjusting screw 46 and is adapted to engage a lever 50 which is one of the control levers of the saw machine. The sliding control members 41 and 42 are secured together at the other end by a cross member 51. The members 41 and 42 are mounted for sliding movement in channels provided by a member 52 mounted on the column 28. One of the sliding members 41 is provided with a rack 53 adapted to engage a spur gear 54 pivotally mounted on one of the columns 28 and adapted to be resiliently held against the rotation by a spring (not shown). The arrow in Fig. 11 indicates the movement that the spring tends to give the gear. The other sliding member 42 is provided with a toothed escapement rack 55 which cooperates with a toothed block 56 carried by a pivoted member 57 by which the truck 30 is moved (Fig. 11). The member 57 is pivoted at 58 to an extension member 59 secured to the truck 30 and is provided with a pin 60 by which connection may be made to the chain 38. A compression spring 61 serves normally to maintain the teeth 55 and 56 on the sliding member 42 and the pivoted member 57 out of engagement normally. The truck 30 is held in position on the rails 26 and 27 by two sliding members mounted on opposite sides thereof, one of which is spring pressed to form a brake as may be seen in Fig. 11. The sliding member 47 carries a resiliently mounted friction brake (not shown) bearing against the rail 26. The brake furnishes sufficient friction so that when the chain that advances the truck is moved the pivoted lever 57 will be moved to bring the teeth 56 into engagement with the tooth 55 to move the sliding control bars 41 and 42 repeatedly after they are restored to normal by the gear 54 at the end of each sawing operation. An adjustable stop 62 is adapted to limit the movement of the pivoted member 57.

The extension member 45 is adjustable on the sliding bars 41 and 42 by means of a clamp 63. An adjustment member 64 is also adjustably secured to the sliding members 41 and 42 by a clamping bolt 65. The adjustment member 64 carries an abutment 66 that is adapted to engage a resiliently mounted stop 67 in one of the columns 28. The stop 67 works against a compression spring 68 in the column 28 (Fig. 11) and fits tightly therein to provide an air cushion.

Figure 3:
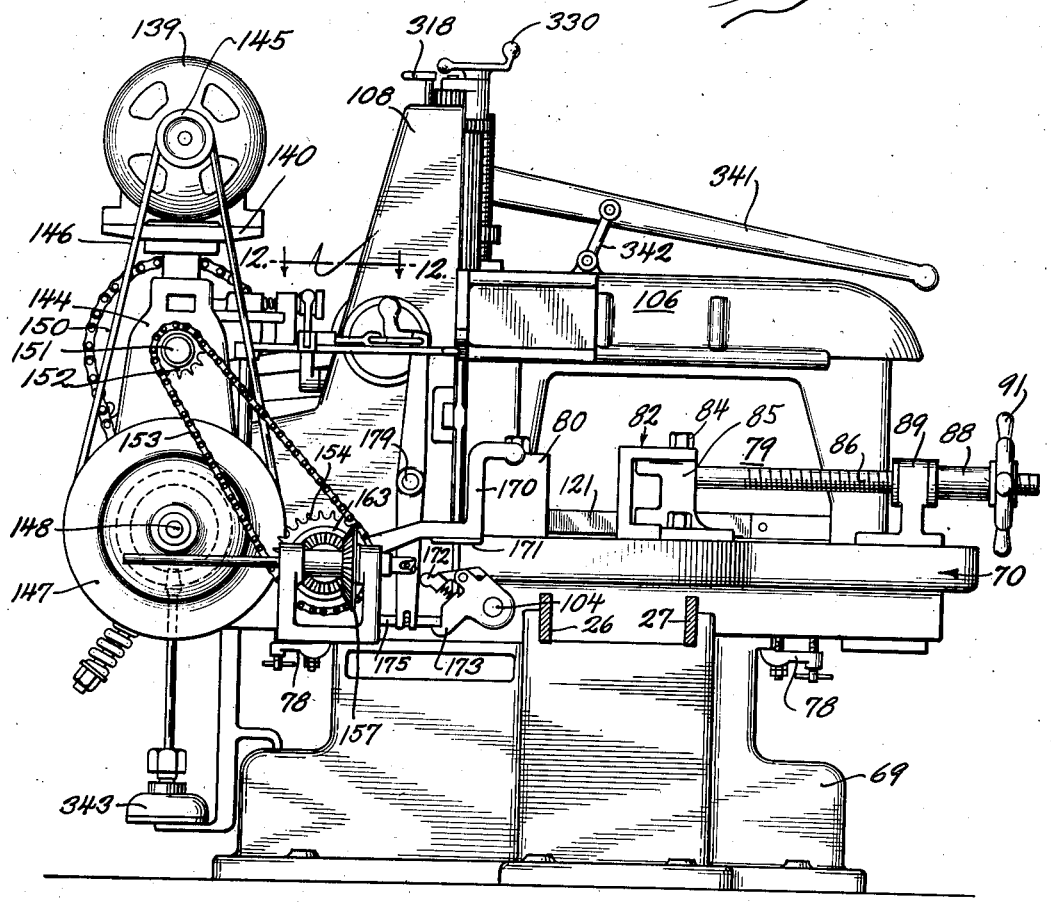
Fig. 3 is a side elevation of the machine.
Figure 4:
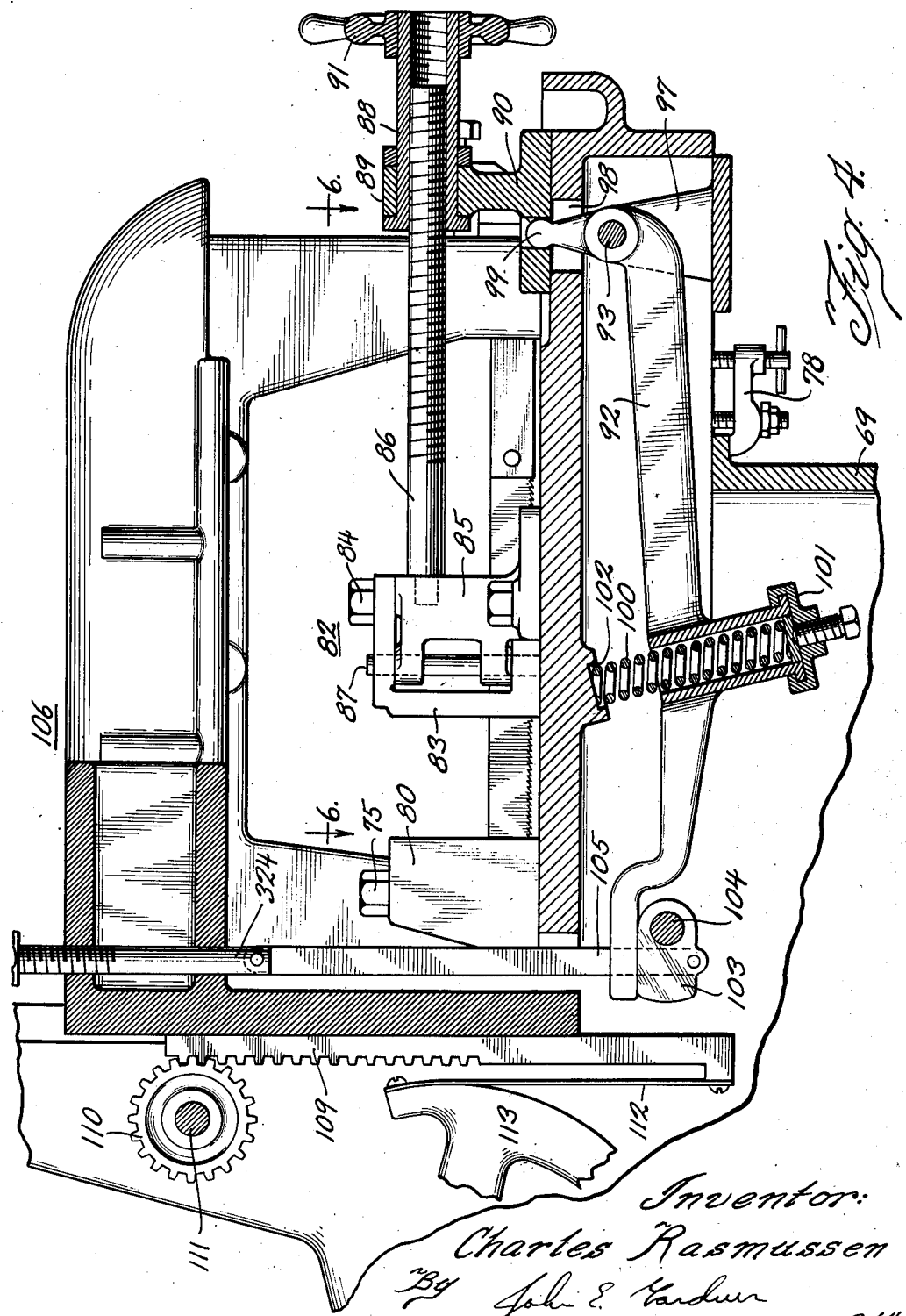
Fig. 4 is a fragmentary sectional elevation of the saw frame taken on the line 4—4 of Fig. 2 looking in the direction of the arrows.
Figure 5:
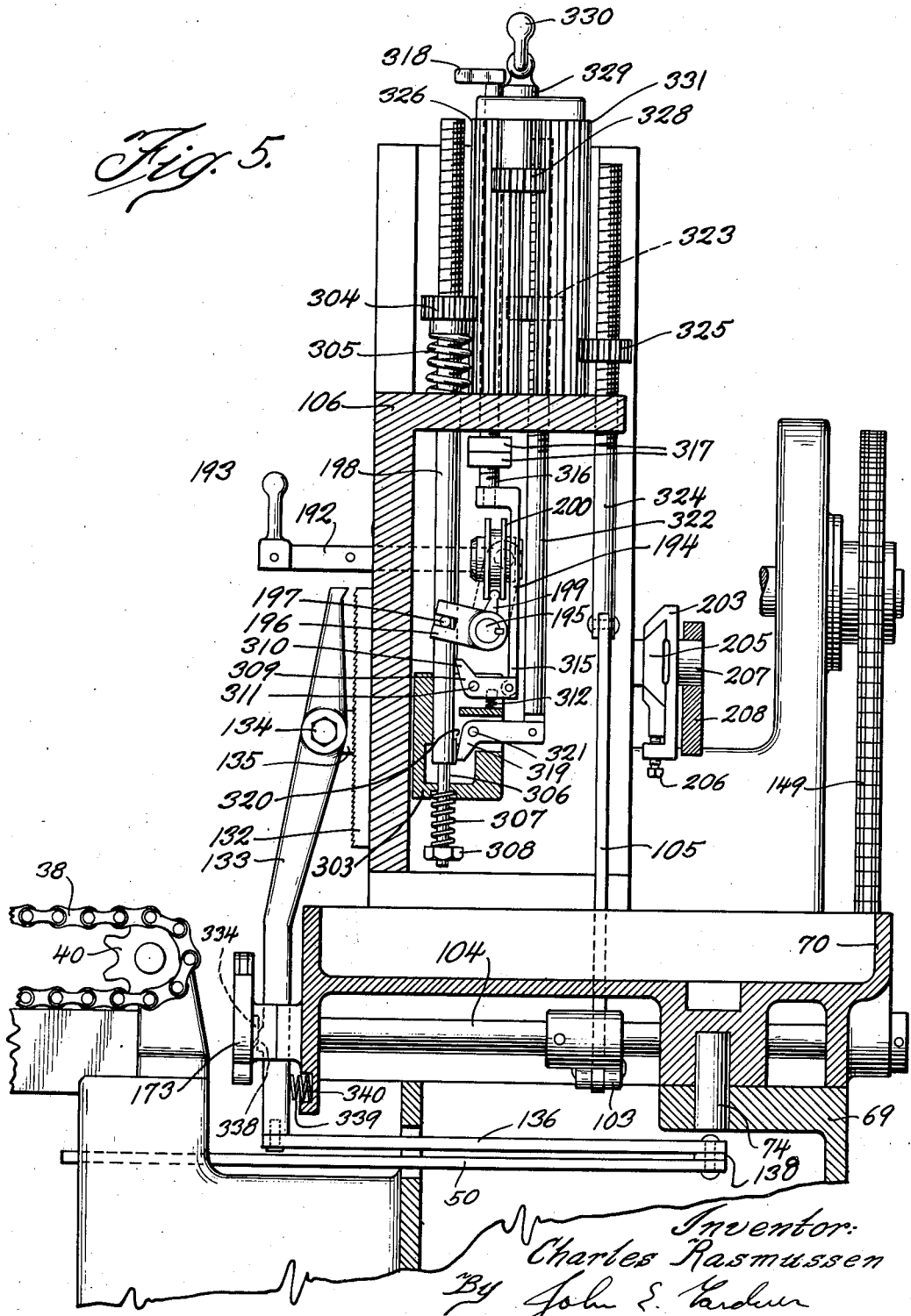
Fig. 5 is a fragmentary cross section of the saw frame taken along the line 5—5 of Fig. 2 looking in the direction of the arrows.

The saw itself comprises a base frame or casting 69 and carries rotatably mounted thereon the saw frame and control mechanism mounted upon a base 70. The saw frame base 70 is pivoted about a bearing 74 (Fig. 5). The base 70 is adjustably held in position by clamping bolts 78 (Figs. 3 and 4). Graduations 77 are provided for determining the position of the saw frame base 70 (Fig. 6).

A vise 79 for clamping the stock while the saw is operating is mounted upon the saw base 70 and comprises an adjustably fixed jaw 80 rotatable about a pivot 81 and clamped by bolts 75 and 76. A movable jaw 82 comprises a channel shaped clamping portion 83 pivotally held by a clamping nut 84 and a pivot pin 87 to a connecting member 85 to which an operating screw bolt 86 is suitably secured. The operating screw bolt 86 passes through a threaded collar 88 (Fig. 4) suitably held in a bearing 89 mounted upon a movable support 90. A hand wheel 91 is suitably splined to the collar 88. The support 90 is movable in the frame 70 so as to provide for some slight longitudinal movement on the operating screw 86. A lever 92 is pivoted about a bearing 93 mounted by a support 97 secured to the saw frame 70. The lever 92 has an annular shaped ball-like extension 92a penetrating an opening 98 in the frame 70 and contacting a recess 99 in the support 90. The lever 92 is held in a downward position by means of a compression spring 100 suitably mounted in an adjustable container 101 attached to the lever 92 and seats at a point 102 in the saw frame 70. The outer end of the lever 92 cooperates with a cam 103 pivoted at 104 and operated by an operating rod 105. A saw frame 106 is slidably mounted upon the base 70 in channels 107 formed in extensions 108 of the saw frame base 70. The saw frame has secured thereto a rack 109 meshing with a spur gear 110 splined to a shaft 111 (Fig. 4). The lower end of the rack 109 has a steel band 112 suitably secured thereto, the other end of which is attached to an arcuate member 113 pivotally mounted at 114 (Fig. 21). The arcuate member has an extension 115 to which is secured an adjustable compression spring 116, the other end of which is mounted on the saw frame 70. The compression spring 116 serves to counterbalance the weight of the saw frame so that it may be moved easily by the rack 109 and the pinion 110, which functions to raise and lower the saw frame so as to bring the saw into contact with the work. The saw frame 106 provides a slidable mounting for the inner hack saw frame 117 which carries the adjustable saw blade 121. The saw blade 121 is suitably held by a member 122 attached to the frame 117 and an adjustable member 123 and is adapted to be tensioned by an adjustable screw 124 (see Figs. 7, 8, 9 and 10).

The inner saw frame 117 slides in channels 125 in the saw frame 106. The frame 117 carries bearing members 126 cooperating with one channel 125 and adjustable bearing members 127 cooperating with the other channel 125. Each of the bearing members 127 are adjustable by means of the bolts 128. There are two bearing members such as 127, each of which are connected to the saw frame 117 by circular extensions 129. Similar circular extensions 130 are provided on the slides 126 and both parts 129 and 130 are rotatably mounted in the circular openings 133 which extend through bosses 132 formed in the upper horizontal portion of the inner saw frame 117. The saw frame 117 thus contacts the bearing members 126 at only two points and these points are in the openings 133. There are four of the adjusting bolts 128 by which the bearing members 127 may be positioned in the frame 117 to provide compensation for wear. Oil holes 131 are provided for lubricating purposes in the outer saw frame 106. The construction of the bearing members and their mounting to cooperate with the inner saw frame 117 is such that should there be any bending of the upper portion of the inner saw frame 117 as a result of the adjustment of the tension of the saw blade 121, the frame 117 may bend without in any way altering the bearing contact in the slides 125 by bearing members 127 and 126, since movement of the saw frame 117 is permitted as it only contacts the bearing members at two points.

This improved form of sliding mounting is highly effective in power saws, and particularly when the saw is employed in the cutting of hard materials, since tensional strain of the frame 117, even to the extent of warping, will have no effect upon its sliding contact.

The saw frame 106 has a toothed ratchet bar 132 suitably secured thereto and adapted to cooperate with a ratchet arm 133 pivoted at 134 upon a bracket 135 secured to the saw base frame 70. The other end of the ratchet lever 133 is pivotally secured to a connecting rod 136, which in turn is secured to the operating lever 50 by a swivel connection 138. The operating lever 50 is adapted to cooperate with the adjustable stop (see Figs. 5 and 1).

A motor 139 is suitably mounted upon a base 140 attached to a raised portion 144 on the saw frame base 70. The motor 139 is provided with a pulley 145 driving a belt 146 which drives a second pulley 147 suitably connected to a shaft 148 through a clutch 141. The clutch 141 may be any usual type of friction clutch so arranged as to be controlled by two pins 142 carried upon a bifurcated yoke 143 (see Fig. 22). The pins 142 are arranged to disengage the clutch under certain conditions. The shaft 148 is rotatable in bearings in the saw base frame 70. The shaft 148 at its other end carries a sprocket 148a which drives a chain 149 meshing with the sprocket 150 secured to a crank shaft 151 rotatable in bearings in the raised portion 144 of the saw base frame. The crank shaft 151 is provided at its opposite end with a sprocket 152 driving a sprocket chain 153 meshing with a sprocket 154 (Figs. 3 and 22).

The sprocket 154 is rotatable upon a stub shaft 155 supported upon the saw frame 70. A beveled gear 156 is rotatably mounted upon the stub shaft 155 and carries a clutch plate 163 secured thereto and adapted frictionally to engage the sprocket wheel 154. The beveled gear 156 meshes with a beveled gear 157 mounted upon a shaft 158 supported in a bifurcated mounting bracket 159 secured to the saw frame 70. The shaft 158 is linked to a shaft 160 by means of a universal joint 161 so as to drive the shaft 160 irrespective of the position of the saw frame table 70. The shaft 160 is rotatable in a bracket 162 secured to the feeding table 25 and carries secured to its other end the sprocket 40 for driving the chain 38.

Another clutch plate 167 is mounted upon the stub shaft 155 on the other side of the sprocket 154 and carries an annular collar 168 having teeth on its upper periphery engaging teeth in a cooperating member 169. The member 169 is rotatably mounted on the shaft 155 and carries an operating lever 170 formed integrally therewith (Fig. 22). The operating lever 170 is provided with a cam surface 171 which is adapted to be engaged by a resiliently supported cam member 172 attached to a member 173 splined to the rock shaft 104 mounted in bearings in the saw frame 70 (Figs. 22 and 5).

The member 173 is provided with an extension 175 cooperating with a slidable latch 176 mounted in the saw frame 70. The sliding latch 175 is provided with a pin 177 cooperating with a notch in a lever 178 pivoted upon a bolt 179 secured to the saw frame 70. The upper end of the operating lever 178 is provided with a handle 180 and is linked by a member 181 to a sliding pin 182 penetrating a bearing 183 in an operating lever 184. The lever 184 is secured to a rock shaft 185 rotatable in a bracket 186 integral with the saw frame 70 and adapted to engage and disengage the clutch operating members 142 of the clutch 141 previously described.

The lever 184 is provided with a handle 187 for the purpose of hand operation. The lever 184 is provided with a socket 191 which provides a channel penetrated by a sliding member 192 carrying a handle 193. The sliding member 192 has pivotally secured thereto a crank arm 194 secured to a rock shaft 195 rotatable in bearings in the saw frame 70. The rock shaft 195 is provided with a notched connecting link 196, the notch of which is penetrated by a pin 197 secured to a sliding shaft 198. The rock shaft 195 also carries a short cam operating arm 199 secured thereto that is adapted to operate the sliding clutch element 200 (see Fig. 5).

Figure 2:
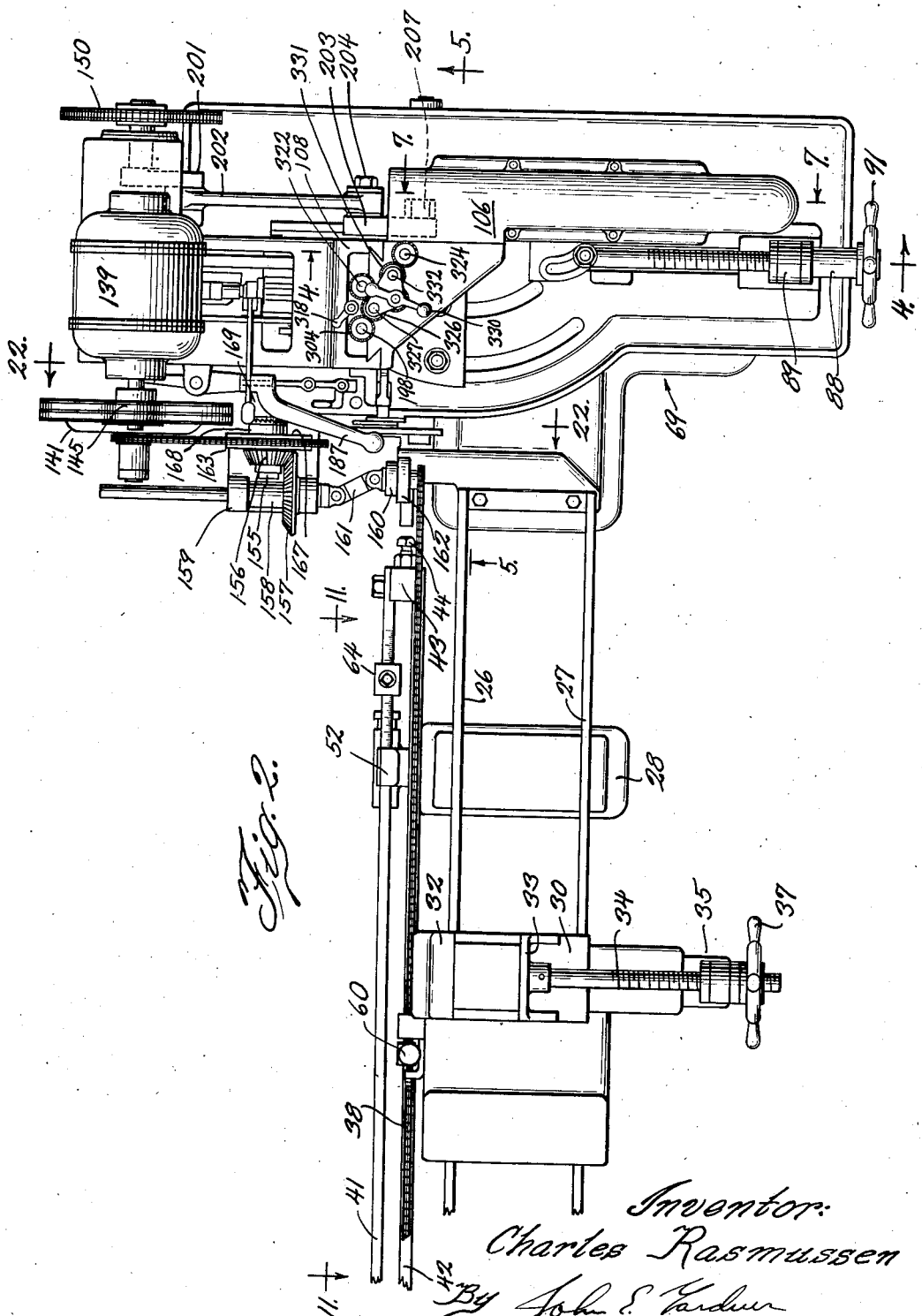
Fig. 2 is a top plan view thereof.

The crank shaft 151 is provided with a crank arm 201 secured to a connecting rod 202. The connecting rod 202 is attached to a slide 203 by means of a stud 204 (Figs. 2 and 5).

The slide 203 is provided with V-shaped channels engaging a support 205 attached to the main saw frame 70. The slide 203 is provided with an adjustment screw 206 to control the frictional contact with the support 205. The slide 203 is provided with a stud 207 secured to a bearing block 208. The bearing block 208 slides in a channel 209 formed in one end of the inner saw frame 117 so as to maintain the connection between the bearing block and the inner saw frame 117 during the up and down motion of the saw frame 106 (see Figs. 7 and 10). The attachment of the slide 203 to the block 208 and the connecting rod 202 by studs 204 and 207 eliminates side strains present ordinarily when one connection is used. The use of the studs provide a pivotal connection so that any slight angular pressure does not effect the easy reciprocate movement of the saw frame.

The mechanism by which the vertical movement of the main saw frame 106 is secured, will now be described. It will be remembered that this vertical movement was brought about by the spur gear 110 keyed to the shaft 111 (see Figs. 4 and 13). The shaft 111 has a hub 210 keyed thereto having an enlarged end portion 211 which is provided with four equally spaced slots 212 therein into which are fitted toothed blocks 213 adapted to engage cooperating teeth 214 in an annular member 215. The enlarged end portion 211 of the hub 210 is spaced from the shaft 111 to permit an extension 216 on the sliding clutch element 200 to work therebeneath and force the toothed blocks 213 into engagement with the teeth 214 on the annular ring 215 (see Figs. 13 and 14).

The toothed blocks 213 are resiliently held in position on the extension 211 of the hub 210 by compression springs 217 in drilled openings 218 in the extension 211. A pin 222 carries the blocks 213 and pushes against the ends of the springs 217. The toothed blocks 213 are slightly tapered towards the toothed end in order to permit a slight rocking thereof to bring about proper engagement with the cooperating teeth 214 (see Figs. 18 and 19).

An annular ring 215 is secured to another ring 223 by means of bolts 224 whereby both rings are rotatable on the hub 210. An annular collar 225 is rotatably mounted about the ring 215 and held in position by a plate 226. A second annular collar 227 (Fig. 13) is rotatably mounted upon the annular ring 223 and maintained in position by a plate 228, the annular collars being spaced apart by a spacer 229. The annular collar 225 is provided with a hollow extension 230 within which is mounted a pivot pin 231. Pivoted about the pin 231 is a lever 232 (Fig. 14) carrying the cam roller 233 mounted thereon and adapted to engage a cam 234 on the crank shaft 151. The lever 232 is provided with a dog 235 adjacent the pivot 231 and adapted to engage the periphery on the annular ring 215. The annular collar 225 is provided with a lug 236 engaging a compression spring 237 mounted in a boss 238 on the saw frame 70. Cooperating boss 239 carries an adjusting screw 240 adapted to engage the lug 236 to limit the rotation of the annular collar 225. When the cam 234 engages the cam roller 233 the lever 232 is caused to pivot about the pin 231 in such a manner that the dog 235 will exert a clamping action against the ring 215. Further movement will then cause the rotation of the ring 215 in a clockwise direction as viewed in Fig. 14. Pivotally mounted on the lever 232 is an auxiliary lever 244 carrying a cam roller 245 adapted to engage a cam 246 on the shaft 151. The auxiliary lever 244 carries a spring socket 247 enclosing a compression spring 248, the tension of which can be controlled by an adjustment 249. A lug 250 is adapted to engage a lug 251 to limit the expansion of the spring 248. When the cam 234 has engaged the cam roller 233 and caused the resultant movement on the shaft 111 thereby, the cam roller 245 engages the cam 246 and tends to rotate the shaft 111 a considerably greater distance than is accomplished by the roller 233. However, any considerable resistance against rotation in the shaft 111 will cause the auxiliary lever 244 to pivot on the lever 232 and compress the spring 248 with the result that the cam 246 serves to urge the shaft 111 in a clockwise direction, but under a spring tension. The further rotation of the crank shaft 151 causes the cams 234 and 246 to disengage the rollers 233 and 245 respectively whereupon the spring 237 acts against the boss 236 to rotate the annular collar 225 counter clockwise until its motion is arrested by the screw 240. Further motion of the lever 232 pivoting about the pin 231 will disengage the dog 235 from the ring 215 and leave the ring 215 freely rotatable within the annular collar 225.

The annular collar 227 (Fig. 16) is provided with a hollow extension 241 in which is mounted a pivot pin 242. A lever 243 is pivoted about the pin 242 and carries at its far end a cam roller 252 cooperating with a cam 253 mounted upon the crank shaft 151. The lever 243 is provided with a dog 254 adapted to cooperate with the annular ring 223. The hollow extension 241 is provided with a recess to provide a socket having a compression spring 255 which presses against the lever 243 mounted therein to tend to maintain the dog 254 from contacting the ring 223. The tension on the spring may be altered by an adjustment screw 256. The annular collar 227 is provided with a lub 264 adapted to engage a compression spring 265, adjustably mounted in a boss 266 on the saw frame base 70. A cooperating boss 277 is provided with an adjustment screw 278. When the cam 253 engages the cam roller 252, the lever 243 will be caused to pivot the pin 242 against the action of the compression spring 255. This motion will cause the dog 254 to engage the surface of the ring 223 and further motion of the cam roller 252 will cause the ring 223 to be moved in a counterclockwise direction against the action of the compression spring 265. With the further rotation on the crank shaft 151, the cam roller 252 is allowed to return to its original position and in so doing, the annular collar 227 is urged to rotate by the spring 265 until the lug 264 contacts the adjusting screw 278. At this point the compression spring 255 causes the lever 243 to pivot about the pin 242 and thereby release the dog 254 from the surface of the ring 223 and thus leave the ring 223 freely rotatable within the annular collar 227.

In the cutting operation of the hack saw, it has been found most satisfactory to have the saw blade urged downwardly under spring tension during its cutting stroke and raised slightly above the work during the return stroke. The mechanism just described accomplishes this result since during one-half of the revolution on the crank shaft 151 carrying the cams 243, 246, 253, the cams 243 and 246 engage the cam rollers 233 and 245, thereby causing clockwise rotation on the shaft 111 and the gear 110. As seen in Fig. 4, this motion causes the saw blade to be lowered and forced against the work under spring tension. This operation takes place during the cutting stroke of the saw. During the return stroke of the saw, the cams 234 and 246 release their rollers 233 and 245 while the cam 253 engages the cam roller 252 and causes the counterclockwise rotation on the shaft 111 and the gear 110 to slightly raise the saw blade.

The shaft 111 also carries a hub 257 keyed thereto. The hub 257 also is provided with an enlarged end portion 258 having four radial slots 259 into which are resiliently mounted toothed blocks 260 supported on springs such as the springs 217 of Fig. 17. This construction is identical with the construction of the other clutch member described in Figs. 13, 14, 15 and 18. The toothed blocks 260 cooperate with internal teeth upon an annular ring member 261. Another annular ring member 262 is mounted adjacent the annular ring 261 and secured thereto by bolts 263 so that both rings rotate upon the hub 257.

An annular collar 267 is rotatably mounted on the outside of the ring 262 through a one-way clutch arrangement by providing four radial slots 268 in the periphery of the ring 262 and mounting rollers 269 therein, together with cooperating springs 270. A second annular collar 271 is similarly rotatably mounted upon the ring 261 through an overriding clutch arrangement formed by providing radial slots 272 about the periphery of the ring 258, together with cooperating springs 273 and rollers 279. A plate 274 maintains the ring 261 and the collar 271 in position and a plate 275 performs a similar duty for the ring 262 and collar 267 on the opposite side. A spacing member 276 separates the two collars 271 and 267. The annular collar 271 carries a lever extension 286 having a cam roller 287 cooperating with a cam 288 on the crank shaft 151 (Fig. 17). The annular ring 271 is also provided with a lug 289 engaging a compression spring 290 mounted in a boss 291 in the saw frame 70. A cooperating boss 292 carries an adjustment bolt 293 threaded therein. The annular ring 267 is provided with a lug 298 adapted to engage a boss 299 in the saw frame 70. A cooperating boss 300 has an adjustment bolt 301 threaded therein by which movement of the collar 267 may be limited.

With the clutch element 200 in the position shown in Fig. 13, it can be seen that the toothed blocks 260 will not be in engagement with their cooperating teeth on the ring 261 and therefore the ring 261, the ring 262 and their associated mechanism will be inoperative. However, when the clutch element 200 is moved to the right as viewed in Fig. 13, a tapered extension 302 will be forced beneath the blocks 260 to cause engagement between these blocks and the cooperating teeth on the ring 261. When in this position the movement of the cam roller 287 by the cam 288 on the crank shaft 151 will cause the annular collar 271 to be rotated in a counterclockwise direction. In so doing, the overrunning clutch mechanism will function by reason of the rollers 279 being clamped between the inclined surfaces of the slots 272 under influence of the springs 273. The ring 261 will therefore be caused to rotate in a counterclockwise direction as viewed in Fig. 17 and further the engagement of the toothed blocks 260 will move the hub 257 and the shaft 111. During this action the compression spring 290 will be compressed, but when the cam roller 287 is released by the cam 288, the spring 290 will carry the annular collar 271 back to its original position, at which time the overrunning clutch rollers 279 will compress the springs 273, thereby causing the ring 261 to remain stationary. In order to prevent any possibility of the ring 261 being moved at this time the ring 262 attached thereto is also provided with similar overrunning clutch rollers 269 and springs 270 mounted within the annular collar 267 rigidly supported by the bosses 299 and 300 and the screw 301. This arrangement is such that the shaft 111, the hub 257 and the rings 261 and 262 may move freely in a counterclockwise direction, but are held against clockwise rotation. From this it can be seen that when the clutch element 200 is moved to the right as viewed in Fig. 13, the continued rotation of the cam 288 will cause the shaft 111 to be intermittently rotated in a counterclockwise direction as viewed in Fig. 17, and that any return motion will be prevented by means of the annular collar 267 and its cooperating overrunning clutch.

In the automatic operation of the saw, it is desirable that the saw blade be moved downwardly under spring tension during the sawing operation and automatically reversed when the cut has been completed. It should then be raised sufficiently to allow the stock to be moved forward preparatory to another cut, but it is not always desirable to raise the saw to its maximum limit by reason of the time that is wasted in moving the saw upwardly and downwardly after it has reached a height sufficient to clear the particular stock being handled. For these reasons it has been found desirable to provide the saw frame with a set of synchronized adjustments whereby the saw when raised to any predetermined position will cause the release of the vise, the feeding of the stock, the clamping of the vise on the work and the reversing of the saw operating mechanism to begin the cutting action. For this purpose certain control mechanisms have been provided which are best shown in Fig. 5. With the parts of the machine shown in the position (Fig. 5), the rock shaft 195 is so positioned that the member 199 has moved the clutch element 200 into the position shown in Fig. 13, which is the position occupied during the cutting cycle of the saw.

As previously stated the position of the shaft 195 is controlled by the member 196 cooperating with the pin 197 on the vertical shaft 198. This vertical shaft 198 is slidably mounted in the saw frame 106, and in a bracket 303 affixed to the saw frame 70. The upper end of the shaft 198 carries a gear 304 threaded thereon, and a compression spring 305 is mounted upon the shaft below the gear 304 and above the top surface of the saw frame 106. The lower end of the shaft 198 carries a reduced portion 306 and a compression spring 307 operates against the bottom surface of the bracket 303 to urge the shaft 198 downwardly. The tension of the spring 307 is adjustable by means of a nut 308.

It should be noted that the spring 305 is of considerably heavier construction than the spring 307 but that in the cutting cycle of the saw there is no tension on the spring 305 but the spring 307 is fully compressed and tends to urge the vertical shaft 198 downwardly. This downward movement is prevented by means of a dog 309 engaging a notch 310 in the shaft 198. The dog 309 has a pivot 311 and a spring 312. A link 315 serves to connect the dog 309 to the lower end of a vertical shaft 316 which is rotatably mounted in the link 315 and slidably mounted in the saw frame 106. Below the lower surface of the saw frame 106 adjusting nuts 317 are threaded upon the shaft 316, and at the extreme upper end of this shaft a handle 318 is provided. Below the dog 309 is a dog 319 adapted to engage a notch 320 on the shaft 198. The dog 319 is pivoted at 321 and pivotally connected to a vertical shaft 322. The shaft 322 is slidably mounted in the saw frame 106 and carries a gear 323 threaded to its upper portion above the saw frame.

The operating rod 105 is connected to a shaft 324 slidably mounted in the saw frame 106 and carrying near its upper end a spur gear 325 threaded thereon.

The position of the gears 304, 323 and 325 determine the point at which the operating shafts 198, 322 and 324 are operating to control the functioning of the saw. It is preferable that their position be variable in order that the distance that the saw frame 106 is raised, may be varied in accordance with the thickness of the stock being cut. The altering of the position of these gears is effective for this position. In order to simplify the adjustment, I provide an arrangement whereby the gears may all be adjusted simultaneously. The gear 304 meshes with a long gear (Fig. 2) mounted upon a shaft 327. The long gear 326 meshes with a spur gear 328 secured to a stub shaft 329 supported in the saw frame extension 108. A crank handle 330 is provided for manually revolving this gear. The gear 328 also meshes with another long gear 331 mounted upon a shaft 332 which, in turn meshes with the gear 325. The long gear 326 also meshes with the gear 323. Since the gears 304, 323 and 325 are screw threaded upon their respective shafts 198, 322 and 324 respectively, turning movement of the gear 328 by means of the crank handle 330 will simultaneously adjust the position of these gears upon their respective shafts. This action will vary their respective heights above the top of the saw frame 106 in synchronism, though always maintaining the same relative difference in position so that the functioning of the various elements as a result of the sliding movement on the shafts will occur in the proper sequence.

The shaft 104 mounted in suitable bearings in the base 70 is provided at one end with a cam 173 having a boss 334 formed integrally therewith to cooperate with a boss 338 upon the locking lever 133 (Figs. 5 and 22). The locking lever 133 is provided with a compression spring 339 mounted in a recess 340 in the sawing frame 70 by which the locking lever 133 may be forced into engagement with the rack 132 so as to lock the saw frame in raised position as the stock is being fed by mechanism on the feeding table.

The resiliently mounted cam member 172 is also controlled by the shaft 104 and is adapted to engage the abutting cam surface 171 on the lever 170 to bring about the operation of the feeding table.

The entire saw frame 106 may be lifted manually by operation of a lever 341 pivoted upon the extension 168 of the saw frame base 70 and linked to the saw frame 106 by a link 342. A pump 343 of any usual and well known type is provided for circulating the cutting fluid or lubricant to the saw in accordance with well known practice.

The operation of my improved automatic saw machine will now be described briefly:

A length of stock to be sawed is placed upon the feeding table and the rear end thereof clamped in the vise 30 by turning the hand wheel 37. The forward end of the stock is locked in the vise 79 by turning the hand wheel after the saw frame table 70 has been positioned to secure the proper angle of cut in accordance with the marking on the scale 77 and after the clamping members 80 and 83 have been angularly positioned in accordance with the position of the saw frame to clamp the stock. The adjusting member 64 is then positioned on the sliding member 41 in accordance with the length of the piece that it is desired the saw to cut from the stock. The handle 330 is then operated to position the gears 304, 323 and 325 to control the elevating movement of the saw frame 106 to accommodate the size of the stock being sawed. The motor 139 is then operated to bring about the sawing operation. By the operation of the motor, the crank arm 202 is caused to oscillate the inner saw frame carrying the saw blade back and forth. The movement of the shaft 104 controls the operation of the feeding mechanism through the clutch members 168 and 169 and cams 171 and 172. The shaft 104 also controls the operation of the spring pressed lever 92, which will release the vise 82 so as to permit another length of stock to be fed forward by the feeding table. The weight of the saw frame 106 is compensated for by the spring 116 previously described. The up and down motion of the saw frame is controlled by the gear 111 through the clutch arrangements of Figs. 12 to 20 inclusive, under the control of the movement of the saw frame 106 as determined by the position of the gears 304, 323 and 325 as well as the stop 317, in a manner that has been described hereinbefore. The saw frame 106 is latched in its uppermost position by the locking lever 133 until time for it to move downwards. This unlocking of the saw frame is controlled by the movement of the stock on the feeding table, which brings the stop 46 into engagement with the rod 50, thereby releasing the saw frame table to permit its downward movement under influence of the clutch drive. At this time the feeding operation of the stock has been completed, and the machine is ready to make a cut. The construction by which the saw is resiliently placed under pressure described in Figs. 14 and 15 serves to regulate the amount of cutting done in accordance with the hardness of the stock.

From the foregoing, it will be seen that the stock is automatically fed and cut off in accordance with the angle desired, the movement of the feeding mechanism and sawing mechanism being all synchronized so that the operations occur in successive cycles in accordance with the position of the stock.

In certain instances it may be desirable to operate the machine without the automatic controls. This is accomplished by movement of the locking lever 180 which locks the shaft 104 against movement as well as disengages the clutch driving the shaft 148. The machine may now be manually operated by operated the lever 170, 187, 193 and the sliding control rod 318 as well as the lever 341 to bring about the functioning of the associated mechanism in an obvious manner.

It will be obvious that my improved machine can be constructed without the automatic control mechanism if it be undesirable in certain instances.

The construction of the feeding mechanism of my improved machine employs the rack bars 41 and 42 to gauge the length of the material being fed for the cut, and is very advantageous since it permits the downward motion of the saw to be adjusted so that the machine need not make a complete cut, but various partial cuts may be made in a length of stock at any appropriate spaced distances. Furthermore, these control rods by which the length of the cut is determined makes for much greater accuracy as in the old practice the gauging was done from the end of the stock and the feeding action was stopped by such engagement. Therefore, any variations in the cut would tend to vary the length of the stock as well as if light stock were being sawed, there would be considerable difficulty in the bending thereof.

The locking arrangement by which the saw frame 106 is maintained in raised position by the lever 133 until the feeding action is entirely complete, is very advantageous since it prevents premature operation of the saw. Of course, a hydraulic cylinder might be employed for this latching operation and valves could be operated as a result of the action of the control rod 50.

Figure 23:
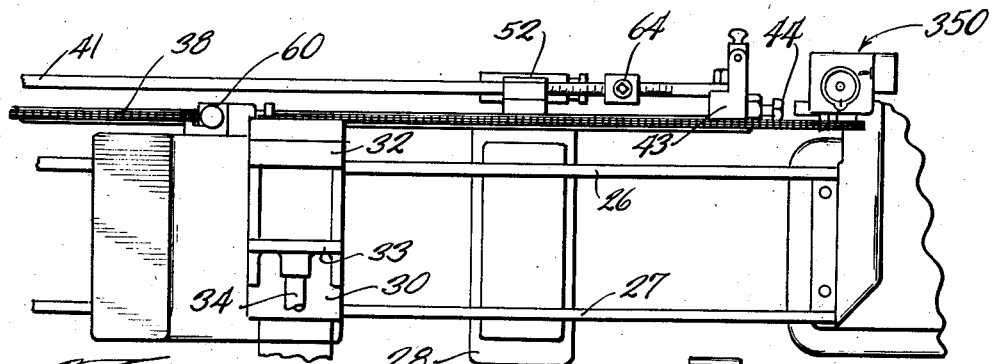
Figs. 23 is a plan and Figs. 24 and 25 are sectional views of details of the counting mechanism.
Figure 24:
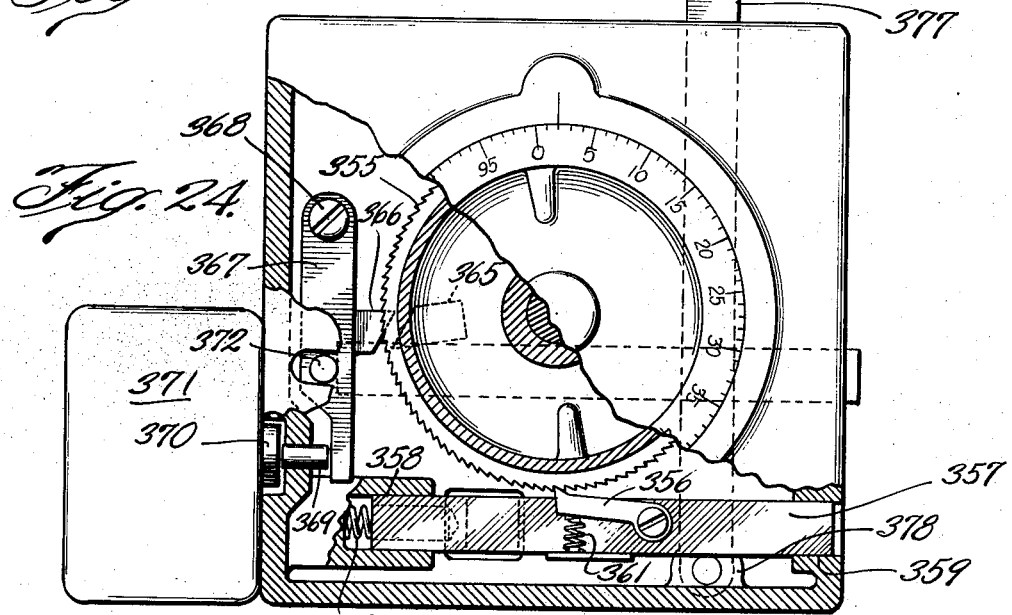
Figure 25:
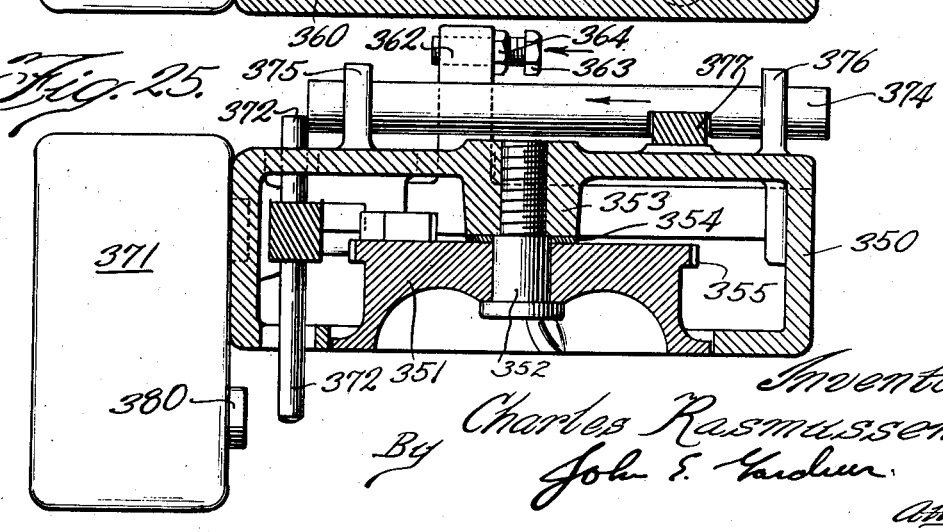

The machine may be provided with a counting arrangement by which it will stop automatically by opening the motor circuit after a predetermined number of sawing operations as may be seen in Figs. 23, 24 and 25.

This counting device comprises a housing 350 suitably secured to the frame 69, and provided with an indicating wheel 351 mounted upon a shaft 352 threaded into a boss 353 of the housing 350. A spring washer 354 is interposed about the threaded shaft 352 between the boss 353 and the indicating wheel 351. The indicating wheel at its lower extremity carries a toothed ratchet 355 formed integrally therewith. An operating pawl 356 cooperating with the ratchhet teeth on the ratchet wheel 355 is mounted upon a square shaft 357, which is slidable in a socket 358 and another socket 359 formed in a boss on the inner side of the housing 350. A spring 360 serves to maintain the sliding shaft 357 in position where the operating pawl 356 will drive the sprocket 355 in a clockwise direction. A pawl spring 361 serves to hold the operating pawl in engagement with the ratchet teeth. The sliding shaft 357 carries an upwardly extending operating arm 362 formed integrally therewith. An adjusting screw 363 is threaded into the end thereof and locked by means of a nut 364 to enable adjustment of the engagement with the stock feeding mechanism as a result of the operation of the cross bar 43. The indicating wheel 351 carries on its lower end a cam 365 which is adapted to cooperate with a cam 366 secured to a lever 367 pivoted on a stub shaft 368. The end of the lever 367 is adapted to engage a pin 369 engaging a push button 370 in a stopping switch 371. The lever 367 carries a pin 372 projecting through it and through openings in the housing 350. The pin 372 at the bottom of the housing abuts a shaft 374 slidable in brackets 375, and 376 formed integrally with the housing 350. The sliding shaft 374 is recessed to receive an operating lever 377 which is pivoted upon a boss 378 formed integrally with the housing 350. The operating lever 377 is adapted to be contacted by the stock feeding carriage 32 when it comes to the end of the stock.

In the operation of the device the hand indicator 351 is set at the number of pieces that it is desired to have the machine cut. By reason of the fact that the dial 351 can only be turned in a clockwise direction, it is calibrated so that the lesser the number of pieces that are to be cut, the greater the rotation of the hand wheel from below it is necessary to make in order to bring the operating cam 365 into position for engagement with the operating lever 366 at the proper time. After the hand wheel has been set, each time a piece of stock has been cut, the nut 44 on the carriage brings about operation of the arm 362 and associated parts causing the ratchet 356 to stop the hand wheel. When the required number of pieces of stock have been cut as indicated by the setting of the hand wheel, the operating cam 365 engages the operating lever 366 and brings about the movement of the arm 367 to depress the push button 370 on the stopping switch 371 through the medium of the sliding pin 369. This brings about the stopping of the machine. Subsequently the same result occurs when all the stock has been cut, and the stock carriage 32 engages the operating lever 377 bringing about longitudinal movement of the shaft 374, and thence of the operating arm 367.

The downward projection of the pin 372 permits the machine to be stopped manually at any time. The push button 380 is for the purpose of bringing about the starting of the machine through the electrical switch 371, which may be of any well known or usual construction.

My invention may be variously changed and modified witout departing from the spirit and scope thereof as indicated in the appended claims.

I claim:

1. In a sawing machine, the combination with a power operated saw and stock feeding mechanism, of means for bringing about the alternate operation of said saw and said mechanism and adjustable means for varying the limit of movement of said mechanism, and means for preventing the operation of the saw while said feeding mechanism is operating, said means including a cam operated through a rack and gear and regulated by spring pressure.

2. In a sawing machine the combination with power operated saw mechanism, stock feeding mechanism, of automatic control means for bringing about the alternate operation of said mechanisms, and means for preventing the simultaneous operation of said mechanisms, said means including a cam operated through a rack and gear and regulated by spring pressure.

3. A straight line saw machine adapted to cut a plurality of uniformly sized pieces from a long piece of stock at a desired angle, said machine including a long platform having spaced parallel rails thereon, a truck member mounted on said rails and capable of traveling back and forth thereon, means for moving said truck back and forth comprising a chain member, a sprocket for driving the same, a vise on said truck member, an automatic saw mechanism pivotally mounted at one end of said elongated platform, said mechanism including a driving motor, a pivotally mounted clamping vise, and a horizontally reciprocating saw positioned thereabove, said saw driven by said motor, a drive from said motor to said chain sprocket, a universal connection therein to compensate for the angle at which the saw mechanism may be pivoted, and means cooperating between said truck and said saw machine for feeding stock to said saw in a continuous, intermittent movement.

4. A straight line saw machine adapted to cut a plurality of uniformly sized pieces from a long piece of stock at a desired angle said machine including a long platform having spaced parallel rails thereon, a truck member mounted on said rails and capable of traveling back and forth thereon, means for moving said truck back and forth comprising a chain member, a sprocket for driving the same, a vise on said truck member, an automatic saw mechanism pivotally mounted at one end of said elongated platform, said mechanism including a driving motor, a pivotally mounted clamping vise, and a horizontally reciprocating saw positioned thereabove, said saw driven by said motor a drive from said motor to said chain sprocket, a universal connection therein to compensate for the angle at which the saw mechanism may be pivoted, and means cooperating between said truck and said saw machine for feeding stock to said saw in a continuous, intermittent movement, said means including a gauge member positioned on and said platform and co-operating with said truck for determining the lengths of the pieces of stock to be cut.

5. A straight line saw machine adapted to cut a plurality of uniformly sized pieces from a long piece of stock at a desired angle, said machine including a long platform having spaced parallel rails thereon, a truck member mounted on said rails and capable of traveling back and forth thereon, means for moving said truck back and forth, a vise on said truck member, an automatic saw mechanism pivotally mounted at one end of said elongated platform said mechanism including protractor means between said saw mechanism and its base, a pivotally mounted clamping vise, an automatically driven saw positioned thereabove, and means cooperating between said truck and said saw machine for feeding stock to said saw in a continuous, intermittent movement.

6. A straight line saw machine adapted to cut a plurality of uniformly sized pieces from a long piece of stock at a desired angle, said machine including a long platform having spaced parallel rails thereon, a truck member mounted on said rails and capable of traveling back and forth thereon, means for moving said truck back and forth, a vise on said truck member, an automatic saw mechanism pivotally mounted at one end of said elongated platform said mechanism including protractor means between said saw mechanism and its base, a pivotally mounted clamping vise, an automatically driven saw positioned thereabove, and means cooperating between said truck and said saw machine for feeding stock to said saw in a continuous, intermittent movement, said means including a gauge member for determining the lengths of the pieces of stock to be cut.

7. A saw machine adapted to cut a plurality of uniformly sized pieces at a desired angle from a long piece of stock, said machine including a long platform having horizontally disposed spaced parallel rails thereon, a truck member mounted on said rails and capable of traveling back and forth thereon, a vise on said truck member, a chain drive associated therewith, an automatic saw mechanism pivotally mounted upon a vertical pivot at one end of said elongated platform, said saw mechanism including a motor, a horizontally disposed reciprocating hack saw driven thereby, and a driving connection between said motor and said chain drive including a universal drive connection whereby said truck member will be advanced by said motor regardless of the angle at which said saw mechanism is pivoted.

8. A saw machine adapted to cut a plurality of uniformly sized pieces at a desired angle from a long piece of stock, said machine including a long platform having horizontally disposed spaced parallel rails thereon, a truck member mounted on said rails and capable of traveling back and forth thereon, a vise on said truck member, a chain drive associated therewith, an automatic saw mechanism pivotally mounted upon a vertical pivot at one end of said elongated platform said saw mechanism having a pivotally mounted stock clamping device thereon, said saw mechanism including a motor, a horizontally disposed reciprocating hack saw driven thereby, and a driving connection between said motor and said chain drive including a universal drive connection whereby said truck member will be advanced by said motor regardless of the angle at which said saw mechanism is pivoted.

9. A saw machine adapted to cut a plurality of uniformly sized pieces from a long piece of stock, said machine including a long platform having horizontally disposed spaced parallel rails thereon, a truck member mounted on said rails and capable of traveling back and forth thereon, a vise on said truck member, measuring means co-operating with said truck and said platform for determining the length of stock to be cut, and an automatic horizontally disposed hack saw mechanism pivotally mounted upon a vertical pivot at one end of said elongated platform, said saw mechanism having a pivotally mounted stock clamping device thereon whereby stock may be fed into said saw mechanism in a straight line and the saw and stock clamping device may co-operate to cut pieces from said stock upon a desired angle.

10. In a sawing machine, the combination with a stock feeding mechanism including a platform, a movable carriage thereon, a vise on said carriage, measuring means associated with said carriage for determining the length of stock to be cut, a power operated saw and means controlled by the saw for initiating the operation of the stock feeding mechanism, said measuring means capable of operation even though only slots are cut into the stock and the same is fed through the sawing machine in one piece.

11. In a sawing machine adapted to cut a plurality of evenly spaced slots in a long piece of stock, the combination with a stock feeding mechanism including a platform, a movable carriage thereon, a vise on said carriage, measuring means associated with said carriage for determining the distance between the slots to be cut, a power operated saw and means controlled by the saw for initiating the operation of the stock feeding mechanism, and locking means for preventing the operation of the saw while the feeding means is operating.

12. In a sawing machine the combination of a base, a power operated horizontally reciprocable hack saw positioned thereon, means for changing the angular position of said saw, a work supporting table fixedly secured to said base, work advancing means thereon, a single motor for driving said saw and said work advancing means and a universal drive connection between said motor and said work advancing means.

13. In a sawing machine the combination of a base, a power operated horizontally disposed reciprocal hack saw positioned thereon, means for changing the vertical angular position of said saw, said means including a pivot on said base vertically aligned with said saw between its ends, a stationary work supporting table associated with said base and a single motor means for moving work forward on said table and for driving said saw.

14. In a sawing machine, the combination of a power driven saw adapted to be reciprocated back and forth, mechanism for feeding the saw through stock to be cut and for returning the saw to a raised position after a sawing operation, said mechanism including a continuously operating crank shaft, a positively operated cam thereon, a frictionally operated ratchet member for feeding said saw downwardly into stock to be cut and spring operated means for feeding said saw downwardly an additional distance depending upon the size and hardness of the stock to be cut.

15. In a sawing machine, the combination of a power driven saw adapted to be reciprocated back and forth, mechanism for feeding the saw through stock to be cut and for returning the saw to a raised position after a sawing operation, said mechanism including a continuously operating crank shaft, a positively operated cam thereon, a friction operated lift member for feeding said saw downwardly into stock to be cut, and automatic means associated therewith for advancing said saw faster or slower in accordance with the hardness or softness of the stock to be cut, said automatic means including a spring member between said positive drive and said saw.

16. In a sawing machine, the combination with a motor, a power operated hack saw and stock feed mechanism driven thereby, of means controlled by the saw for initiating the operation of said stock feeding mechanism, said stock feeding mechanism including a plurality of rails, a vise slidable thereon, a chain member aligned with said rails for moving said vise forward, means associated with said hack saw for controlling the movement of said chain and a micrometer measuring mechanism associated with said chain whereby forward movement of the same is accurately and positively controlled by said measuring mechanism, and locking means for preventing the operation of said hack saw while the feeding mechanism is operating.

17. In a sawing machine, the combination with a motor, a power operated hack saw and stock feed mechanism driven thereby, of means controlled by the saw for initiating the operation of said stock feeding mechanism, said stock feeding mechanism including a plurality of rails, a vise slidable thereon, a chain member aligned with said rails for moving said vise forward, means associated with said hack saw for controlling the movement of said chain and a micrometer measuring mechanism associated with said chain whereby forward movement of the same is accurately and positively controlled by said measuring mechanism, locking means for preventing the operation of said hack saw while the feeding mechanism is operating, a fixed vise for holding the stock beneath the saw while the hack saw is functioning and means controlled by the stock feed mechanism for releasing said fixed vise while stock is being fed to a work position beneath said hack saw.

18. In a sawing machine for miter cutting a plurality of equal lengths of stock in a continuous process, the combination with a motor, a power operated swively mounted hack saw and a stock feed mechanism, both driven by said motor, of means for giving said saw a horizontal reciprocating motion and means for reciprocating said saw in a vertical direction, said stock feed mechanism controlled by the saw, said stock feed mechanism including a plurality of rails, a vise slidable thereon, a chain member for moving said vise forward, a universal joint connection between said motor and said chain member, micrometer measuring mechanism associated with said chain whereby step by step forward movement of the same is accurately controlled and a control mechanism on said saw for initiating the downward movement of the saw and automatic means for reversing the vertical movement of said saw at a predetermined point in its downward travel.

19. In a sawing machine the combination with a motor, a power operated hack saw and stock moving means both driven by said motor, of means for giving said saw a horizontal reciprocating motion and means for reciprocating said saw in a vertical direction, said stock moving means controlled by the saw, and stock measuring mechanism associated with said stock moving means, said measuring mechanism including a control member secured to said stock moving means, a rack on said control member, a gear normally resiliently held against rotation meshing therewith, a second toothed rack on said control member, a toothed block meshing therewith carried by a bracket on said stock moving means, a chain member aligned with said stock moving means, and a pin on said bracket extending through said chain, said chain driven in a forward direction by said motor.

20. In a sawing machine the combination with a power operated swively mounted hack saw and a stationary stock feeding table, of automatic power driven means on said table for causing the movement of stock toward said saw, and means for adjusting the angular position of said saw with respect to said table, a single source of power for both said saw and said stock moving means, said source of power adapted to swivel with said saw and a universal joint connection between said source of power and said stock moving means.

21. In a sawing machine, the combination with a power operated swively mounted hack saw and stock feeding mechanism of automatic control means for bringing about the alternate operation of said saw and said mechanism, and manually operable means for disabling said automatic control means, a motor providing a single source of power for both said saw and said stock feeding mechanism, said motor adapted to swivel with said saw and a universal joint connection between said motor and said stock feeding mechanism.

22. In a sawing machine, the combination with a power operated reciprocating saw mechanism and stock feeding mechanism of automatic means for bringing about the alternate operation of said saw and said mechanism and means for preventing the operating of the saw while said feeding mechanism is operating, said means including a continuously driven crank shaft, cam members mounted thereon, a rack secured to said saw mechanism, a gear meshing with the same, a shaft for said gear, a plurality of ratchet members on said shaft, an actuating lever for each ratchet member, said levers having rollers engaging said cam members for intermittently lowering said saw mechanism during each forward stroke of said saw and raising the same during the reverse stroke, a sliding clutch on said shaft, control means actuated by the saw mechanism reaching a desired position adapted to move said sliding clutch to raise the saw mechanism by certain of said ratchet members and simultaneously start said stock feeding mechanism.

23. In a sawing machine, a power operated reciprocating saw mechanism, a stock feeding mechanism, a motor for driving both said saw mechanism and said stock feeding mechanism, a driving connection between said motor and said stock feeding mechanism, means for preventing the operation of the saw while said feeding mechanism is operating, said means including a continuously driven crank shaft, cam members mounted thereon, a rack secured to said saw mechanism, a gear meshing with the same, a shaft for said gear, a plurality of ratchet members on said shaft, an actuating lever for each ratchet member, said levers having rollers engaging said cam members for intermittently lowering said saw mechanism during each forward stroke of said saw and raising the same during the reverse stroke, a sliding clutch on said shaft, control means actuated by the saw mechanism reaching a desired position adapted to move said sliding clutch to raise the saw mechanism by certain of said ratchet members and engage simultaneously said driving connection to start said stock feeding mechanism.

24. In a sawing machine, the combination of a motor, a reciprocating saw mechanism and stock feeding mechanism driven thereby, said driving means including a continuously driven crank shaft, cam members mounted thereon, a rack secured to said saw mechanism, a gear meshing with the same, a shaft for said gear, a plurality of ratchet members on said shaft, an actuating lever for each ratchet member, said levers having rollers engaging said came members for intermittently lowering said saw mechanism during each forward stroke of said saw and raising the same during the reverse stroke, a sliding clutch on said shaft, control means actuated by the saw mechanism reaching a desired position adapted to to move said sliding clutch to raise the saw mechanism by certain of said ratchet members and simultaneously start said stock feeding mechanism.

25. In a sawing machine, a motor, a vertically reciprocal saw frame, a horizontally reciprocal saw carried thereby, an oscillating crank arm connected thereto and driven by said motor, means for vertically moving said saw frame, said means including a continuously driven crank shaft connected to said motor, cam members mounted thereon, a rack secured to said saw frame, a gear meshing with the same, a shaft for said gear, a pair of ratchet members on said shaft and an actuating lever for each ratchet member, said levers having rollers engaging said cam members for intermittently lowering said saw mechanism during each forward stroke of said saw and raising the same during the reverse stroke.

26. In a sawing machine, a motor, a vertically reciprocal saw frame, a horizontally reciprocal saw carried thereby, an oscillating crank arm connected thereto and driven by said motor, means for vertically moving said saw frame, said means including a continuously driven crank shaft connected to said motor, cam members mounted thereon, a rack secured to said saw frame, a gear meshing with the same, a shaft for said gear, a pair of ratchet members on said shaft and an actuating lever for each ratchet member, said levers having rollers engaging said cam members for intermittently lowering said saw mechanism during each forward stroke of said saw and raising the same during the reverse stroke, and a sliding clutch on said shaft adapted to disengage one ratchet member and engage the other to raise said saw at the end of a cutting stroke.

CHARLES RASMUSSEN.